United States Patent
Ashton Vital Brazil et al.

(10) Patent No.: US 11,386,143 B2
(45) Date of Patent: Jul. 12, 2022

(54) SEARCHING FOR ANALOGUE SUBSURFACE STRUCTURES BASED ON TOPOLOGICAL KNOWLEDGE REPRESENTATION (TKR)

(71) Applicants: International Business Machines Corporation, Armonk, NY (US); Petrogal Brasil S.A., Rio de Janeiro (BR)

(72) Inventors: Emilio Ashton Vital Brazil, Rio de Janeiro (BR); Rodrigo da Silva Ferreira, Rio de Janeiro (BR); Andrea Britto Mattos Lima, Sao Paulo (BR); Renato Fontoura de Gusmão Cerqueira, Rio de Janeiro (BR); Viviane Torres da Silva, Rio de Janeiro (BR); Rogerio A. de Paula, Sao Paulo (BR); Marco Daniel Melo Ferraz, Oeiras (PT); Astrid De Jesus Torres Fernandez, Lisbon (PT); Joana de Noronha Ribeiro de Almeida, Lisbon (PT); Dario Sergio Cersósimo, Sintra (PT)

(73) Assignees: International Business Machines Corporation, Armonk, NY (US); Petrogal Brasil S.A., Rio de Janeiro (BR)

( * ) Notice: Subject to any disclaimer, the term of this patent is extended or adjusted under 35 U.S.C. 154(b) by 223 days.

(21) Appl. No.: 16/557,973

(22) Filed: Aug. 30, 2019

(65) Prior Publication Data
US 2021/0064651 A1 Mar. 4, 2021

(51) Int. Cl.
*G06F 16/53* (2019.01)
*G06F 17/18* (2006.01)
*G06F 16/55* (2019.01)

(52) U.S. Cl.
CPC .............. *G06F 16/53* (2019.01); *G06F 16/55* (2019.01); *G06F 17/18* (2013.01)

(58) Field of Classification Search
CPC .......... G06F 16/53; G06F 16/55; G06F 16/50; G06F 16/532; G06F 16/70; G06F 16/5866; G06F 16/90335; G06F 16/5854
See application file for complete search history.

(56) References Cited

U.S. PATENT DOCUMENTS

| 5,495,604 A | 2/1996 | Harding et al. |
| 5,584,024 A | 12/1996 | Shwartz |

(Continued)

FOREIGN PATENT DOCUMENTS

| CN | 108304668 A | 7/2018 |
| CN | 108537883 A | 9/2018 |

OTHER PUBLICATIONS

Mell et al., "The NIST Definition of Cloud Computing", National Institute of Standards and Technology, NIST Special Publication 800-145, Sep. 2011, 7 pages.

(Continued)

*Primary Examiner* — Baoquoc N To
(74) *Attorney, Agent, or Firm* — Matthew J. Bussan

(57) ABSTRACT

Method, apparatus, and computer program product are provided for retrieving analogues using topological knowledge representation (TKR). In some embodiments, a TKR input query is built and/or validated using a domain-specific knowledge base (KB). A search database containing candidate analogues and corresponding pre-built TKRs is then searched to retrieve at least one analogue of the TKR input query using statistical analysis. In some embodiments, a system may build the TKR input query based on a seismic dataset. For example, the system may receive a seismic dataset, segment the seismic dataset and classify each region using a computer vision (CV) database and the KB, and (Continued)

build the TKR input query based on the segmented and classified seismic dataset. In some embodiments, the TKR input query may be input and/or edited by a user. For example, the TKR input query may be input and/or edited by the user and validated using the KB.

21 Claims, 22 Drawing Sheets

(56) References Cited

U.S. PATENT DOCUMENTS

| | | | |
|---|---|---|---|
| 5,710,877 | A | 1/1998 | Marimont et al. |
| 6,084,595 | A | 7/2000 | Bach et al. |
| 6,240,423 | B1 | 5/2001 | Hirata |
| 6,563,950 | B1 | 5/2003 | Wiskott et al. |
| 7,065,250 | B1 | 6/2006 | Lennon |
| 8,144,921 | B2 | 3/2012 | Keet al. |
| 8,401,342 | B2 | 3/2013 | Ruzon et al. |
| 8,543,573 | B2 | 9/2013 | MacPherson |
| 8,705,870 | B2 | 4/2014 | Wang et al. |
| 8,718,378 | B2 | 5/2014 | Li et al. |
| 8,724,911 | B2 | 5/2014 | Saund |
| 8,768,105 | B2 | 7/2014 | Luo et al. |
| 8,942,515 | B1 | 1/2015 | Huang |
| 2003/0041047 | A1 | 2/2003 | Chang et al. |
| 2004/0088291 | A1 | 5/2004 | Matsuzaki et al. |
| 2007/0185946 | A1 | 8/2007 | Basri et al. |
| 2009/0324107 | A1 | 12/2009 | Walch |
| 2010/0185994 | A1* | 7/2010 | Pikus ............... G06F 30/398 716/52 |
| 2012/0284237 | A1* | 11/2012 | Li ............... G06F 21/554 707/687 |
| 2013/0132402 | A1 | 5/2013 | Yang et al. |
| 2014/0297546 | A1 | 10/2014 | Birdwell et al. |
| 2016/0196672 | A1 | 7/2016 | Chertok et al. |
| 2016/0299929 | A1 | 10/2016 | Park et al. |
| 2020/0284936 | A1 | 9/2020 | da Silva Ferreira et al. |

OTHER PUBLICATIONS

Cavero et al., "Importance of conceptual geological models in 3D reservoir modelling", First Break, vol. 34, Jul. 2016, pp. 39-49.

Matellanes et al., "Creating an Application for Automatic Annotation of Images and Video", An IP.com Prior Art Database Technical Disclosure, IP.com No. IPCOM000141283D, 11 pages, Nov. 13, 2006.

Prabhu et al., "Attribute-Graph: A Graph based approach to Image Ranking", 2015 IEEE International Conference on Computer Vision (ICCV), Dec. 2015, pp. 1071-1079.

Petrakis et al., "ImageMap: An Image Indexing Method Based on Spatial Similarity", IFFF Transactions on Knowledge and Data Engineering, vol. 14, No. 5, Sep./Oct. 2002, pp. 979-987.

Dasigi et al., "Efficient Graph-based Image Matching for Recognition and Retrieval", 8 pages, downloaded from <https://pdfs.semanticscholar.org/54ac/0efa7d5a3b43e56cea6e7f67e3443e5874bb.pdf> on Aug. 29, 2019.

Ganea et al., "Graph Object Oriented Database for Semantic Image Retrieval", 14 pages, downloaded from <http://ceur-ws.org/Vol-639/151-ganea.pdf> on Aug. 29, 2019.

* cited by examiner

SEARCHING FOR ANALOGUE SUBSURFACE STRUCTURES BASED ON TOPOLOGICAL KNOWLEDGE REPRESENTATION (TKR)

BACKGROUND

The present invention relates in general to the field of information handling. More particularly, the present invention relates to retrieving analogues using topological knowledge representation (TKR).

One of the most valuable approaches that geoscientists employ to infer properties about a new region is to compare the new region with analogue areas for which additional information is available. Transferring the knowledge from one explored area to a new one can help to accelerate decisions. Seismic images can provide a representation of subsurface structures, which may be used in the petroleum industry exploration process in the search for oil and gas accumulations. When working with seismic images, an important analogue could be, for example, a region with a similar arrangement of geological structures.

Thus, unlike a traditional image search that involves searching for images in a database that best match a query image, geoscientists and others involved in the petroleum industry exploration process may wish to retrieve images focusing on a specific topological structure rather than considering visual attributes alone. For example, geologists may wish to search for seismic images with particular arrangements of geological structures or specific order of sediments (also referred to as "geological scenarios").

SUMMARY

Embodiments of the present disclosure include a method, apparatus, and computer program product for retrieving analogues using topological knowledge representation (TKR). In accordance with some embodiments, a TKR input query is built and/or validated using a domain-specific knowledge base (KB) containing information about a geological domain, such as relationships (e.g., arrangements) of geological structures. A search database containing candidate analogues and corresponding pre-built TKRs is then searched to retrieve at least one analogue of the TKR input query using statistical analysis. In accordance with some embodiments, a system may build the TKR input query based on a seismic dataset. For example, the system may receive a seismic dataset, segment the seismic dataset and classify each region using a computer vision (CV) database and the domain-specific KB, and build the TKR input query based on the segmented and classified seismic dataset. In accordance with some embodiments, the TKR input query may be input and/or edited by a user. For example, the TKR input query may be input and/or edited by the user and validated using the domain-specific KB.

BRIEF DESCRIPTION OF THE SEVERAL VIEWS OF THE DRAWINGS

Embodiments will hereinafter be described in conjunction with the appended drawings, where like designations denote like elements.

DETAILED DESCRIPTION

Figure 1:
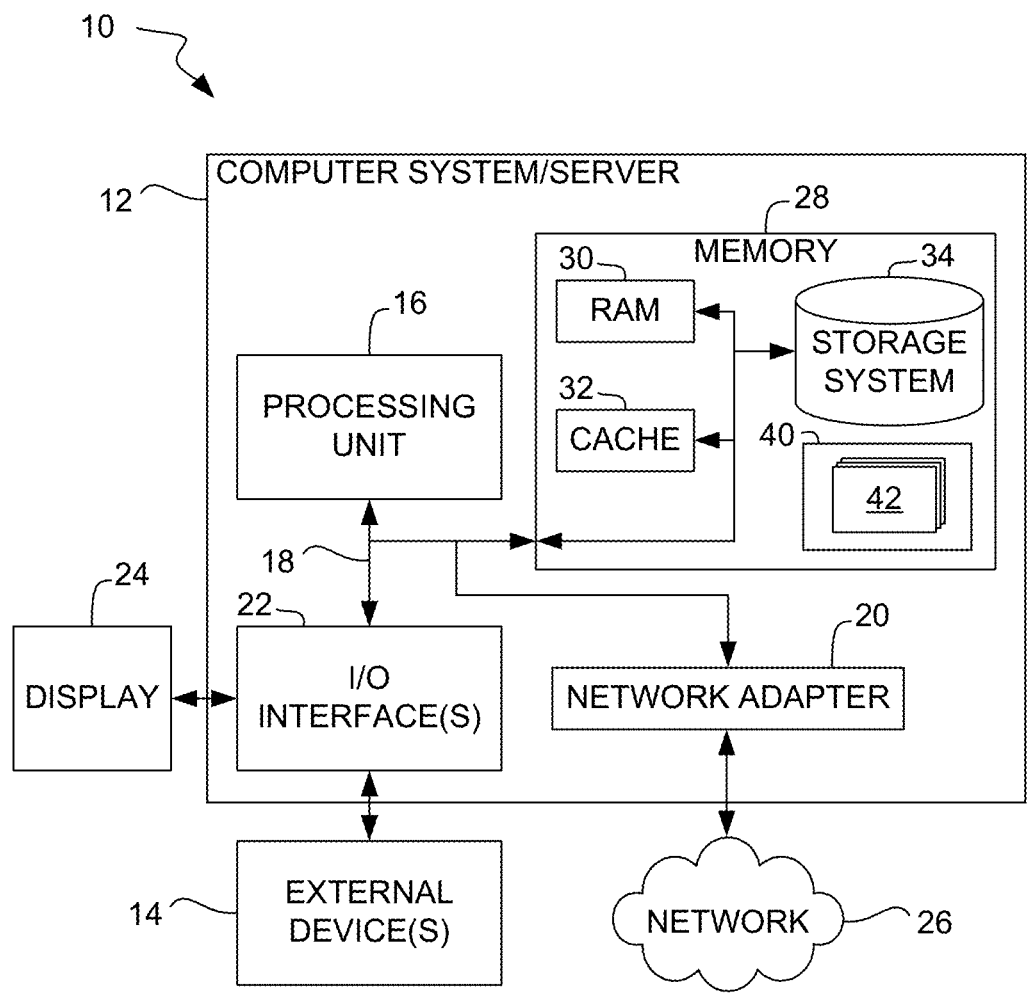
FIG. 1 depicts a cloud computing node, according to one or more embodiments.

In accordance with some embodiments, geoscientists and other users can perform structural queries on a database, focusing on topological information. For example, structural knowledge may be extracted from a seismic dataset to build a topological knowledge representation (TKR) input query and similarity metrics may be computed between the query and database candidates taking into account topological matching. In accordance with some embodiments, structural graph extraction relies on a domain-specific knowledge base (KB), i.e., a database with information about the arrangements of the geological structures. Using pre-defined rules (e.g., valid arrangements and/or frequent relationships) stored in the domain-specific KB, segmentation and classification may be performed more robustly, resulting in the construction of a TKR input query (i.e., a TKR of the seismic dataset) with higher accuracy.

Topological knowledge representations (TKRs), in accordance with some embodiments, may be constructed in a robust way using rules from a domain-specific KB. The accuracy of topological extraction (also referred to herein as "structural graph extraction") is directly affected by errors that may occur during segmentation and classification operations, which errors may not be trivial, considering the uncertainties of their parts. In accordance with some embodiments, the accuracy of structural graph extraction is improved through the use of a domain-specific KB storing information that allows refining the construction of the TKR. This improvement in the accuracy of structural graph extraction is applicable both to TKRs built for an input query and TKRs built for geological scenarios stored in a search database.

The combination of topological information with domain knowledge enables indexing of geological scenarios, empowering geoscientists and other users to search for and retrieve particular arrangements of geological structures or specific order of sediments (also referred to as "geological scenarios"). Thus, by combining topological information with rules from a domain-specific KB, topological knowledge representations may be built in a robust way. The combination of topological information with domain knowledge allows geological scenarios to be compared empowering geoscientists and other users to retrieve analogues. The more probable geological scenarios among those stored in a search database may be retrieved as analogues and ranked by leveraging statistical reasoning enabled by topological knowledge representation (which, in accordance with some embodiments, may be built in a more robust way by combining topological information with rules from a domain-specific KB).

In accordance with some embodiments, a TKR is built, leveraging rules from a domain-specific KB, for an input query and each geological scenario in a search database and similarities are computed using high-level topological matching.

In accordance with some embodiments, the similarity between two regions (vertices of TKR) A, B may be calculated as follows:

$$S(A, B) = 1 - \frac{W_v D_v(A, B) + W_{ny} D_{ny}(A, B) + W_{no} D_{no}(A, B)}{W_v + W_{ny} + W_{no}}, \quad (1)$$

where $W_*$ are non-negative weights and $D_*(A, B)$ are in $[0, 1]$, and $*_v$ are correspondent to the properties of the region (vertex), $*_{ny}$ are correspondent to the properties of the younger neighbors, and $*_{no}$ are correspondent to the properties of the older neighbors as the following formula:

$$D_v(A, B) = \frac{\Sigma w_i P_i(A, B)}{\Sigma w_i}, \quad (2)$$

the property i in A and B to $[0, 1]$. For instance, in the case of categorical properties, this maps to 0 if they have the same class, and 1 otherwise. For $D_{ny}(A, B)$ and $D_{no}(A, B)$ the distance described above may be calculated for each possible combination obtaining neighbor of A and of B and obtaining the final average as result.

To measure the similarity between TKRs, equation (1) may be utilized in pairs (A, B) where A is a region from on TKR and B is a region from the other TKR and average it to obtain a similarity score. Ranking may be obtained by ordering the scores.

An emerging information technology (IT) delivery model is cloud computing, by which shared resources, software, and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar, and/or collaboration infrastructure in the cloud, and an end user would use an appropriate client to access his or her email, or perform a calendar operation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, as well as removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"), and other non-removable, non-volatile media (e.g., a "solid-state drive"). Although not shown, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM or other optical media can be provided. In such instances, each can be connected to a bus 18 by one or more data media interfaces. As will be further described below, memory 28 may include a computer program product storing a set (e.g., at least one) of program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In accordance with some embodiments, program modules 42 are adapted to generally carry out the one or more functions and/or methodologies of one or more embodiments.

Computer system/server 12 may also communicate with one or more external devices 14 such as a keyboard, a pointing device, a display 24, etc.; one or more devices that enable a user to interact with computer system/server 12; and/or any device (e.g., network card, modem, etc.) that enable computer system/server 12 to communicate with one or more other computing devices. Such communication can occur via Input/Output (I/O) interfaces 22. Still further, computer system/server 12 can communicate with one or more networks such as a local area network (LAN), a general wide area network (WAN), and/or a public network (e.g., the Internet) via network adapter 20. As depicted, the network adapter 20 communicates with other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
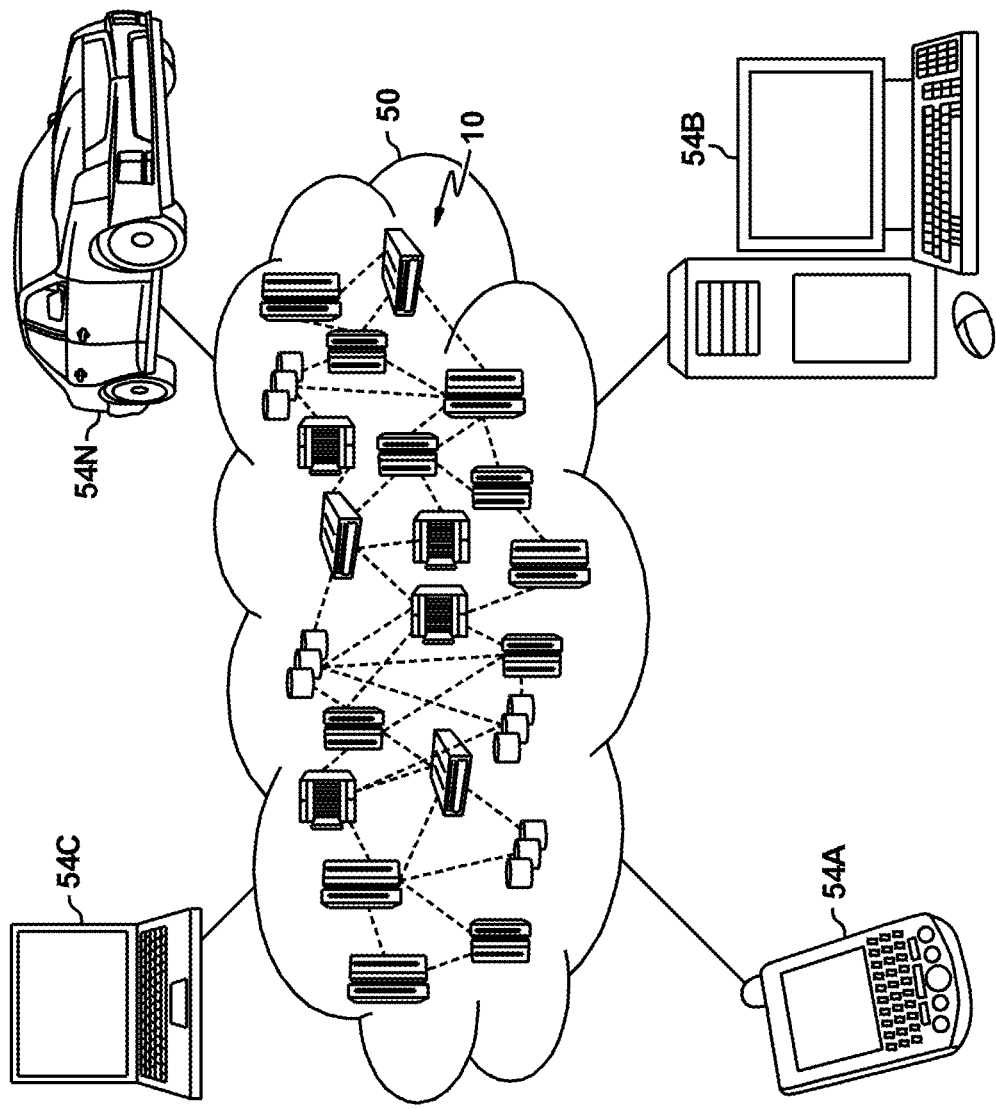
FIG. 2 depicts a cloud computing environment, according to one or more embodiments.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
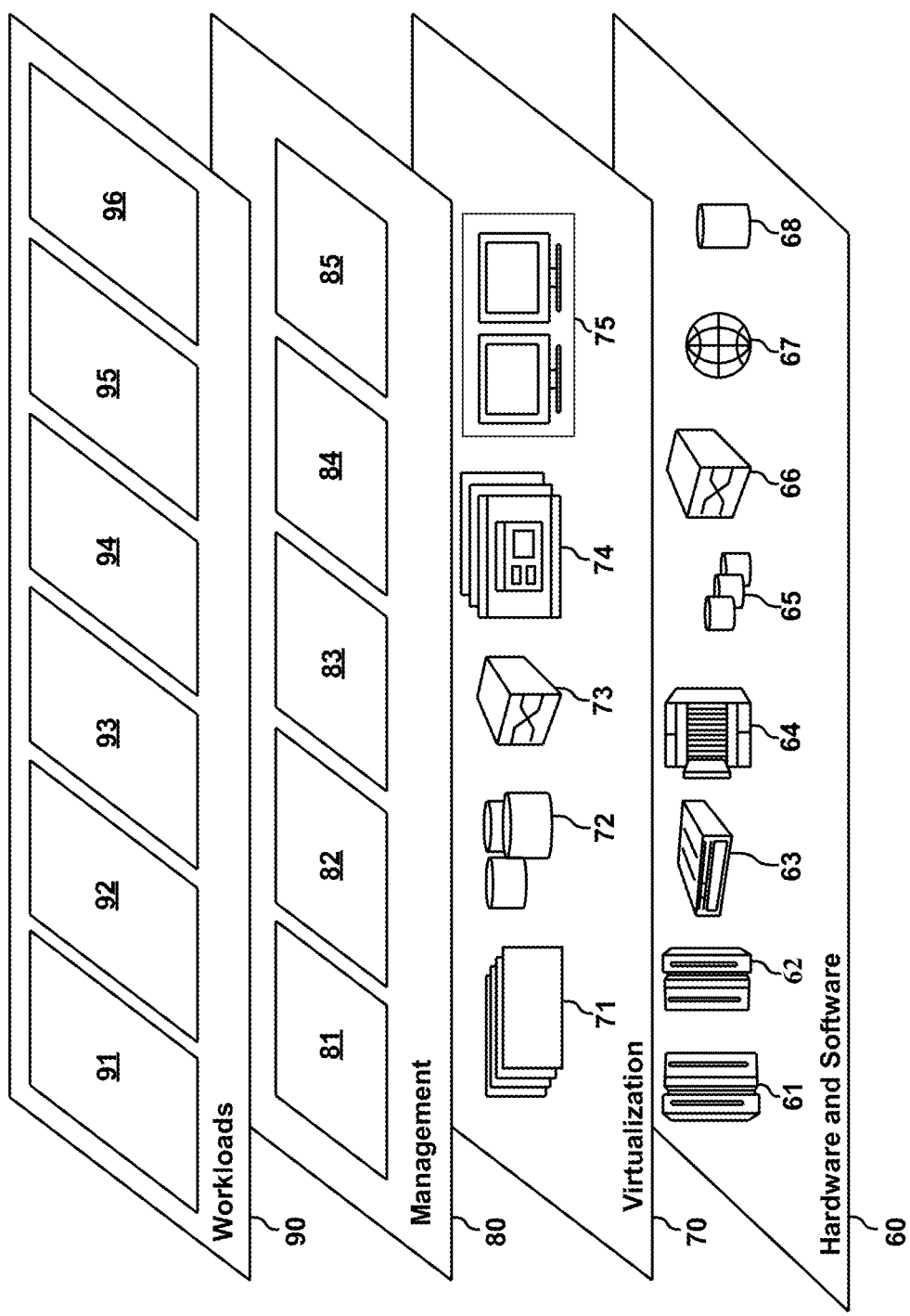
FIG. 3 depicts abstraction model layers, according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In accordance with some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and topological knowledge representation (TKR) search processing 96.

Figure 4:
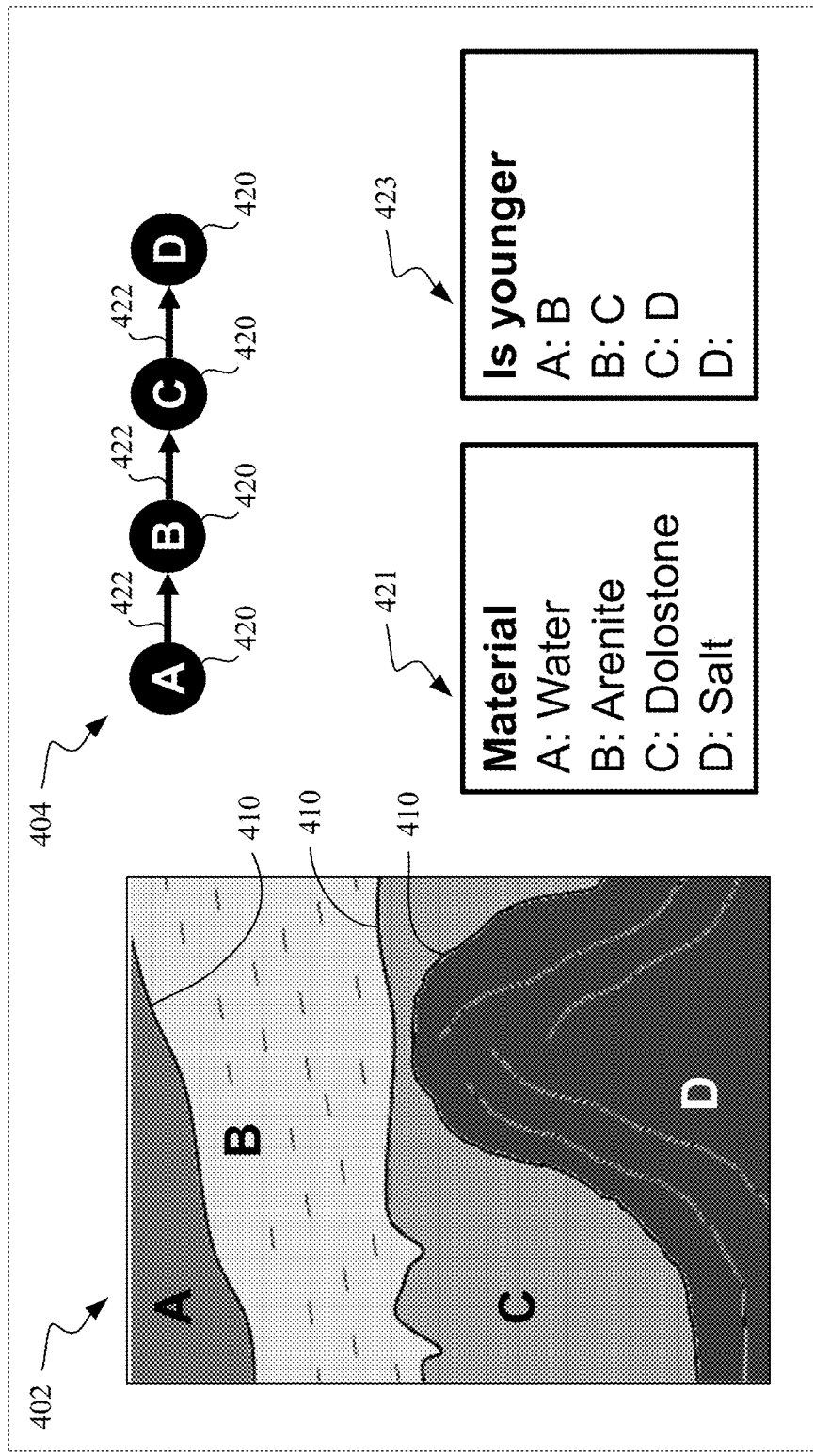
FIG. 4 depicts an exemplary seismic image and corresponding topological knowledge representation (TKR), according to one or more embodiments.

Referring now to FIG. 4, an exemplary seismic image 402 and corresponding TKR 404 (also referred to herein as a "structural graph" or "graph") are depicted in accordance with one or more embodiments. The exemplary seismic image 402 may represent segmented and classified seismic data produced by a system (e.g., a server system 1104 in FIG. 11 using algorithms contained in computer vision (CV) database 1120, rules contained in domain-specific KB 1122, and/or TKR building modules(s) 1154) upon receiving seismic data from another system (e.g., a client system 1102 in FIG. 11) into which a geoscientist or other user inputs (e.g., using seismic input module(s) 1134 in FIG. 11) the seismic data as a 2-dimensional (2D) "slice" seismic image or a 3-dimensional (3D) "volume" seismic image. The exemplary seismic image 402, as illustrated in FIG. 4, represents a seismic dataset that has been segmented and classified into four regions (denoted as A, B, C, and D). The four regions A, B, C, and D of the exemplary seismic image 402 are separated from each other by three segment lines 410.

The TKR 404 is a structural graph corresponding to the exemplary seismic image 402. The TKR 404 includes four vertices 420 (denoted as A, B, C, and D) that respectively correspond to the four regions A, B, C, and D of the exemplary seismic image 402. Vertices are also referred to herein as "nodes". In the embodiment illustrated in FIG. 4, the vertices 420 respectively represent each region's "Material" (also referred to herein as "Lithology"), i.e., region A is "Water", region B is "Arenite", region C is "Dolostone", and region D is "Salt". In the embodiment illustrated in FIG. 4, each region's "Material" is denoted in a table 421. More generally, however, the vertices of a TKR in accordance with one or more embodiments may represent any suitable type of region(s), such as lithology, age, diagenetic process, image pattern(s), physical attribute(s), etc.

The TKR 404 also includes three edges 422 that each represent one or more relationships between respective vertices 420. In the embodiment illustrated in FIG. 4, the three edges 422 are arrows that represent the relationship "Is younger" between nodes A and B (i.e., region A is younger than region B, region B is younger than region C, region C is younger that region D, and region D is younger than null). In the embodiment illustrated in FIG. 4, the "Is younger" relationship between nodes is denoted in a table 423. More generally, however, the edges of a TKR in accordance with one or more embodiments may represent any suitable type of relationship(s) between nodes, such as "Is younger", "Interfaces", "On top", "Same geological formation", "Erode", "Intrude", etc. For example, edges representing various additional types of relationships are illustrated in FIGS. 14-17.

Figure 5:
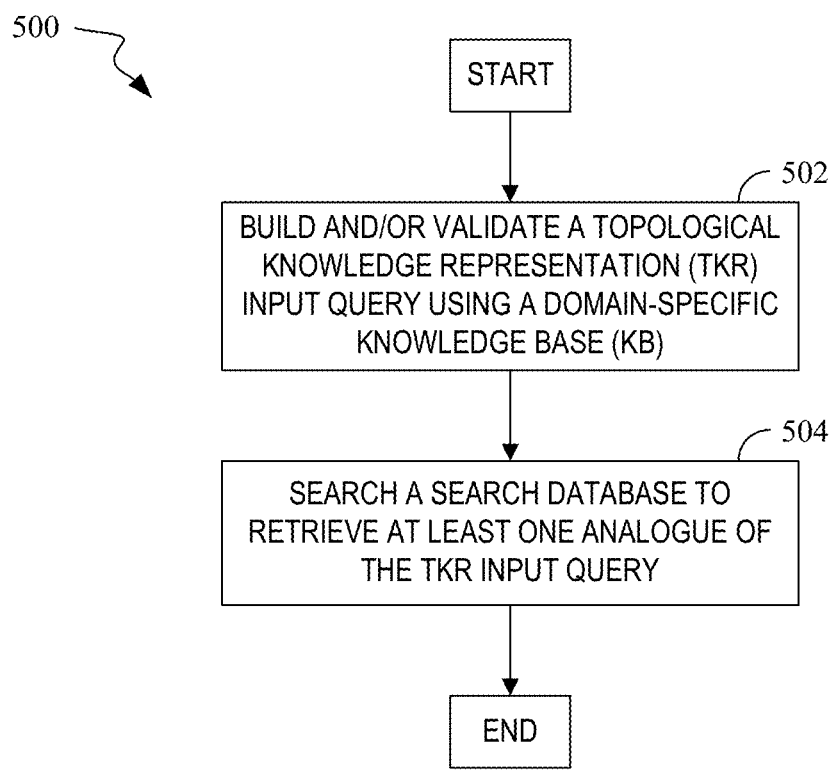
FIG. 5 is a flow diagram of a method of retrieving analogues using TKR, according to one or more embodiments.

Referring now to FIG. 5, a flow diagram of a method 500 of retrieving analogues using TKR is depicted in accordance with one or more embodiments. The method 500 sets forth the preferred order of the blocks. It must be understood, however, that the various blocks may occur at any time relative to one another.

Figure 8:
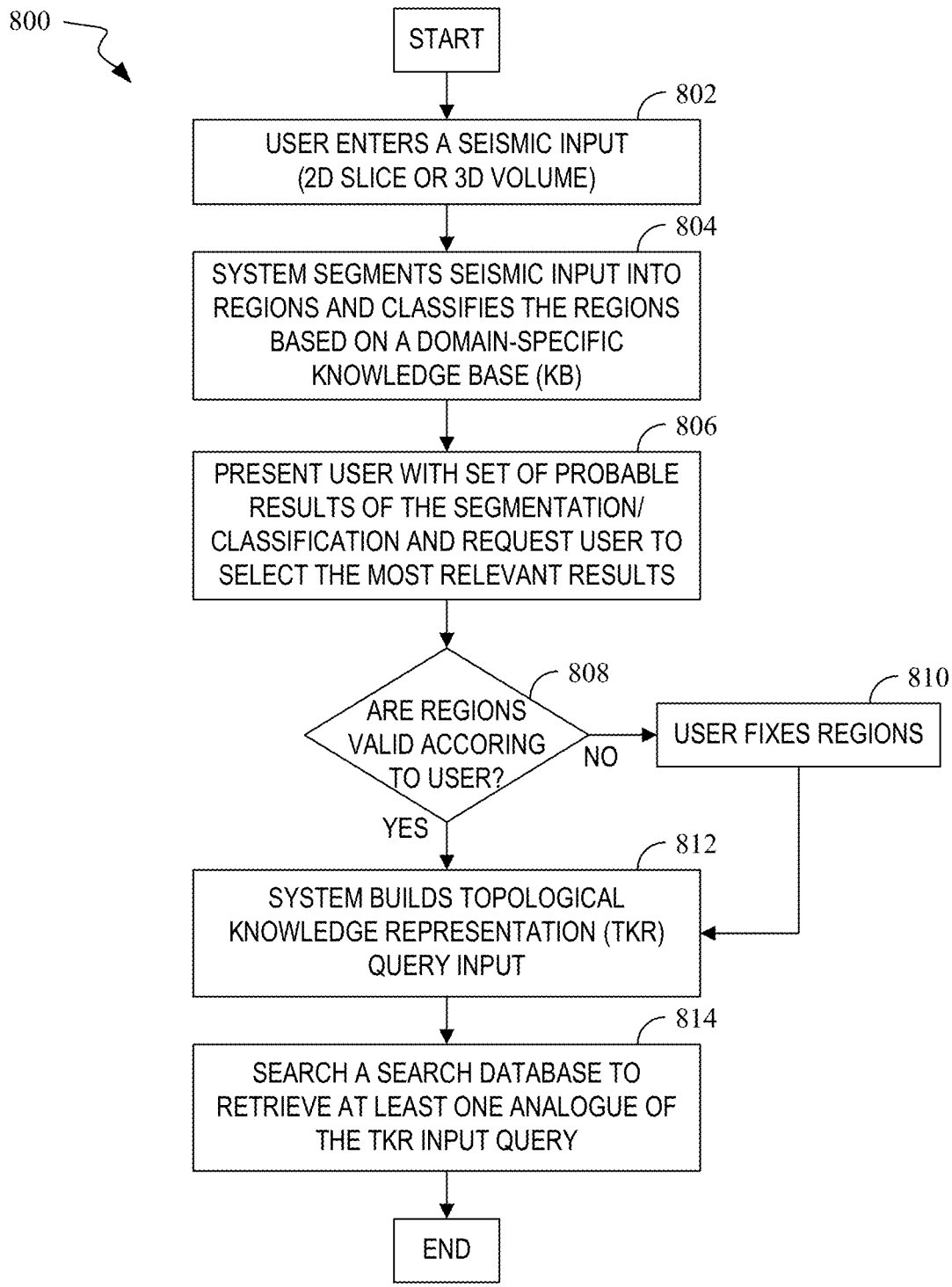
FIG. 8 is a flow diagram of a method of retrieving analogues using TKR in which a TKR input query is built based on seismic dataset input by a user, according to one or more embodiments.
Figure 9:
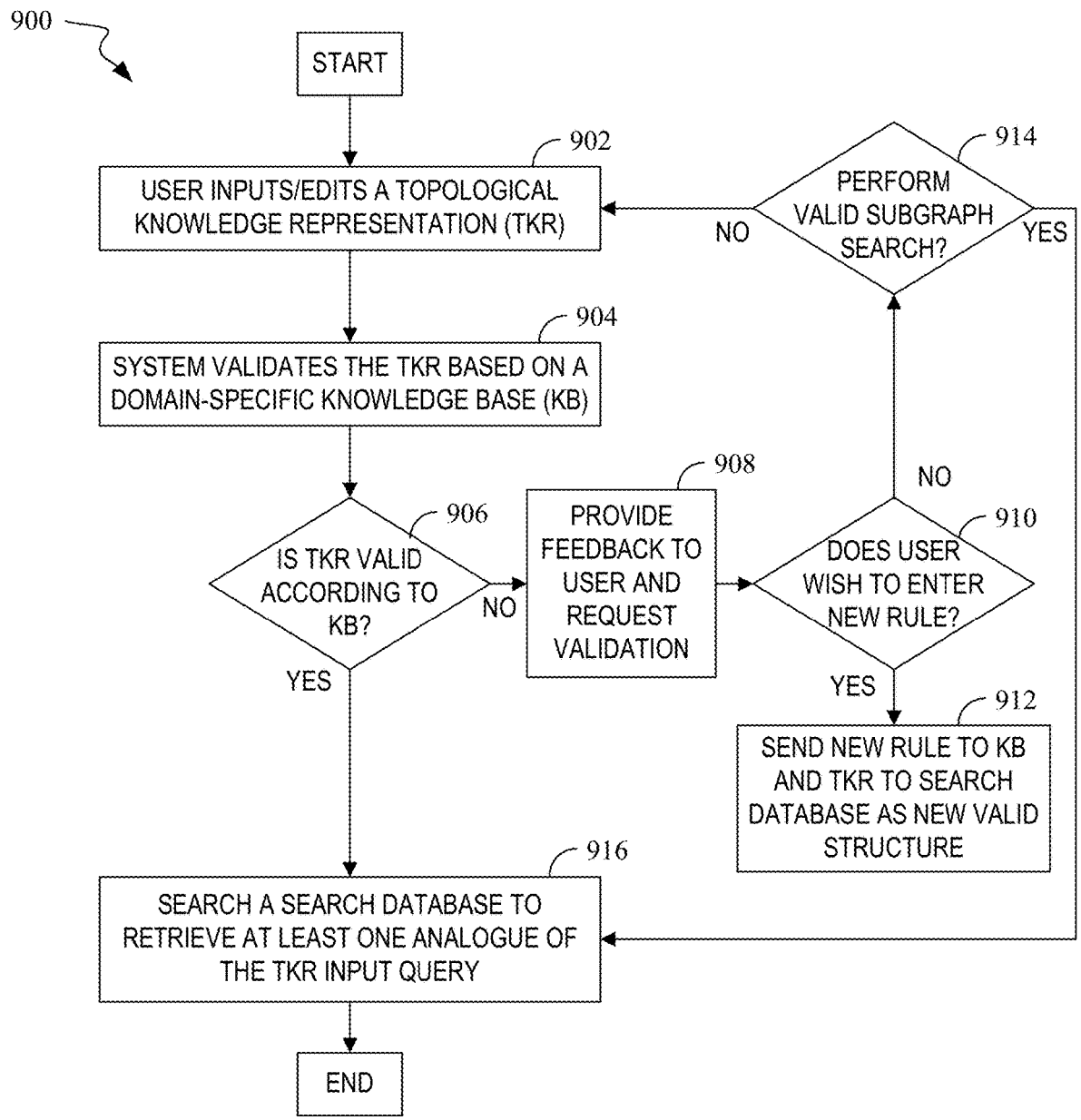
FIG. 9 is a flow diagram of a method of retrieving analogues using TKR in which a TKR input query is validated after being input and/or edited by a user, according to one or more embodiments.

The method 500 begins by building and/or validating a TKR input query using a domain-specific KB (block 502). For example, the domain-specific KB may contain information about a geological domain, such as relationships (e.g., arrangements) of geological structures. In accordance with some embodiments, a system may build the TKR input query based on a seismic dataset input by a user. For example, a system may receive a seismic dataset input by a user, segment the seismic dataset and classify each region using a CV database and the domain-specific KB, and build the TKR input query based on the segmented and classified seismic dataset. An illustrative example of operations that may be performed in block 502 (in the context of building a TKR input query based on a seismic dataset input by a user) is illustrated in FIG. 8. In accordance with some embodiments, the TKR input query may be input and/or edited by a user. For example, the TKR input query may be input and/or edited by a user and validated using the domain-specific KB. An illustrative example of operations that may be performed in block 502 (in the context of validating a TKR input query after the query was input and/or edited by a user) is illustrated in FIG. 9.

Figure 10:
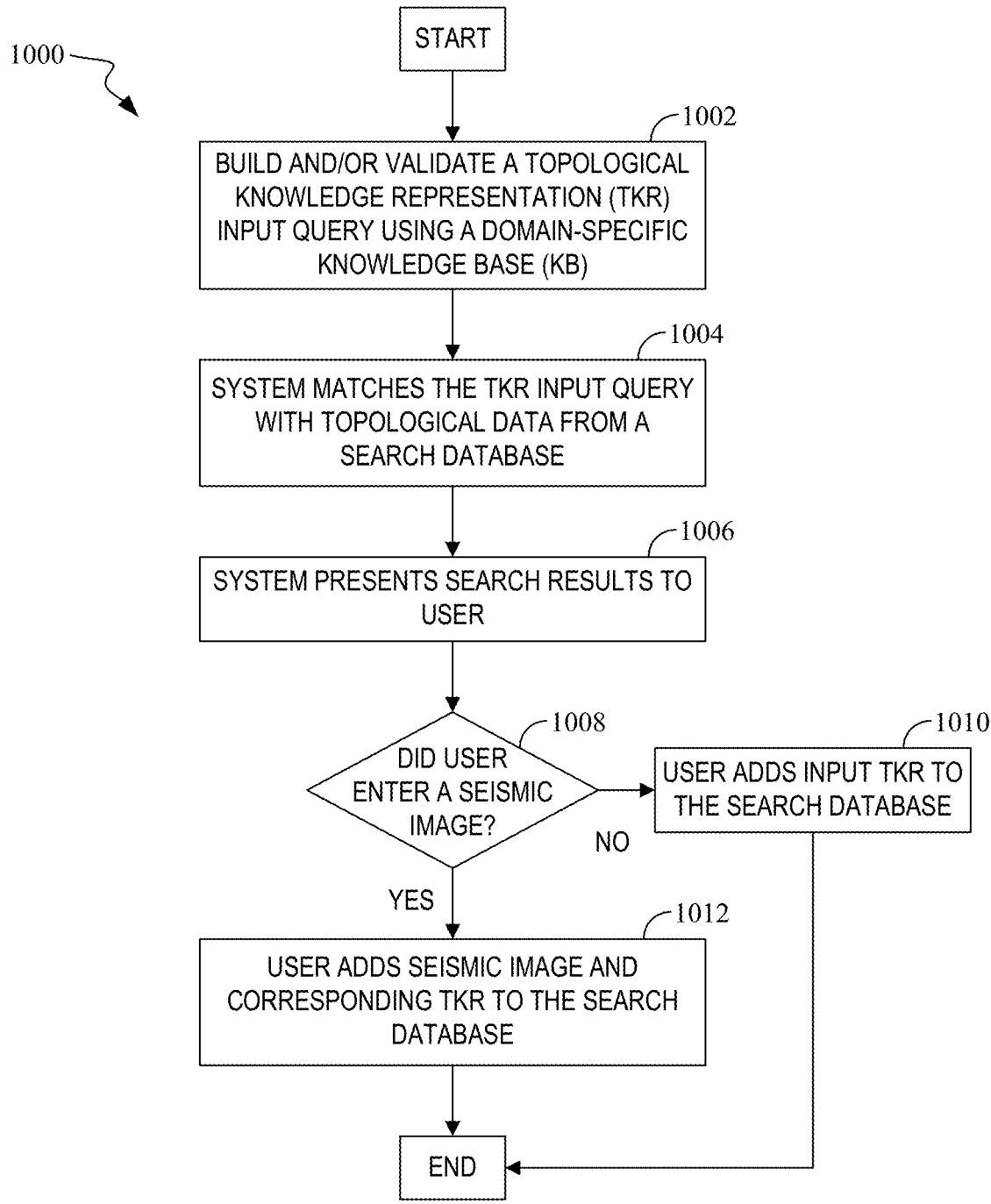
FIG. 10 is a flow diagram of a method of retrieving analogues using TKR in which a system matches a TKR input query with topological data from a search database, according to one or more embodiments.

The method 500 continues by searching a search database to retrieve at least one analogue of the TKR input query using statistical analysis (block 504). Then, the method 500 ends. For example, using a valid TKR input query (i.e., a TKR input query built in block 502, or validated in block 502 after being input and/or edited by a user), the valid TKR input query may be matched against each candidate stored in the search database via topological matching. During this operation, sub-structures from the search database may be considered; so the system is able to retrieve images that contain sub-regions with the desired topological structure. The search database may contain candidate images (i.e., seismic images that may or may not be analogues of seismic image represented by the TKR input query) and corresponding graphs (i.e., pre-built TKRs corresponding to the stored seismic images). For each graph in the search database, the system may look for graph-isomorphism in the subgraphs, taking into account the concepts in the domain-specific KB. For example, mismatches between topology and node classes can be used to measure uncertainty (e.g., exemplary mismatches with respect to these criteria are illustrated FIG. 7). Taking into account the concepts in the domain-specific KB may help the system decide which of these criteria is more relevant for the task. An illustrative example of operations that may be performed in block 504 is illustrated in FIG. 10.

Figure 6:
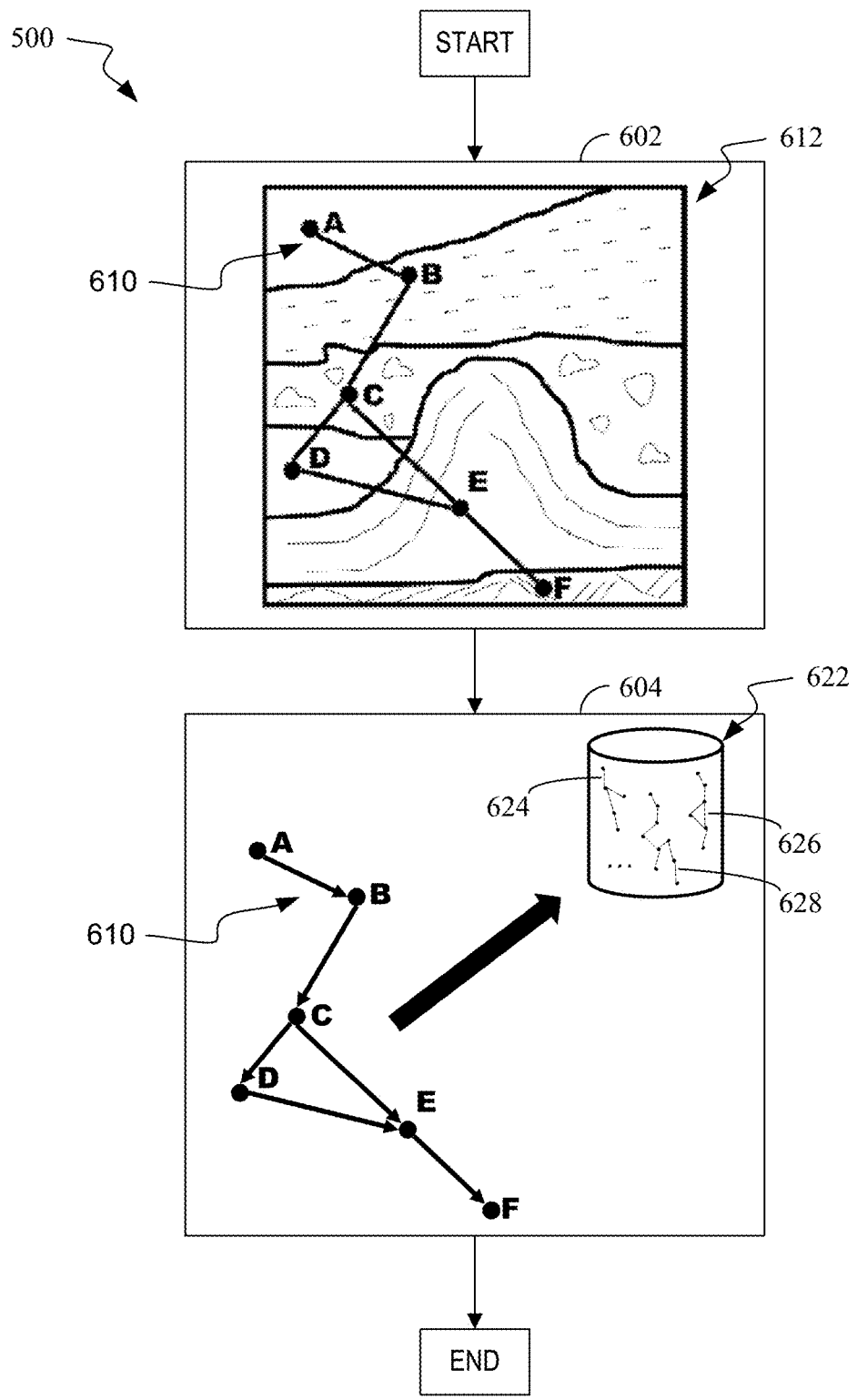
FIG. 6 is a flow diagram depicting in conceptual form an instructive example of the method of retrieving analogues using TKR shown in FIG. 5, according to one or more embodiments.

Referring now to FIG. 6, a flow diagram is depicted that illustrates in conceptual form an instructive example of the method 500 of retrieving analogues using TKR shown in FIG. 5 in accordance with one or more embodiments. Block 602 in FIG. 6 corresponds to block 502 in FIG. 5. Likewise, block 604 in FIG. 6 corresponds to block 504 in FIG. 5.

Block 602 depicts a TKR input query 610 built from an exemplary seismic image 612. The exemplary seismic image 612 may represent segmented and classified seismic data produced by a system (e.g., a server system 1104 in FIG. 11 using algorithms contained in CV database 1120, rules contained in domain-specific KB 1122, and/or TKR building modules(s) 1154) upon receiving seismic data from another system (e.g., a client system 1102 in FIG. 11) into which a geoscientist or other user inputs (e.g., using seismic input module(s) 1134 in FIG. 11) the seismic data as a 2-dimensional (2D) "slice" seismic image or a 3-dimensional (3D) "volume" seismic image. The exemplary seismic image 612, as illustrated in FIG. 6, represents a seismic dataset that has been segmented and classified into six regions (denoted as A, B, C, D, E, and F). The six regions A, B, C, D, E, and F of the exemplary seismic image 612 are separated from each other by five segment lines. The TKR input query 610 is a structural graph corresponding to the exemplary seismic image 612. The TKR input query 610 includes six vertices (denoted as A, B, C, D, E, and F) that respectively correspond to the six regions A, B, C, D, E, and F of the exemplary seismic image 612. The TKR input query 610 also includes six edges that each represent one or more relationships (e.g., "Interfaces") between respective vertices.

Block 604 depicts a search database 622 searched to retrieve at least one analogue of the TKR input query 610 using statistical analysis. The search database 622 may contain candidate images (i.e., seismic images that may or may not be analogues of seismic image represented by the TKR input query 610) and corresponding graphs (i.e., pre-built TKRs, such as pre-built TKRs 624, 626, 628, corresponding to the stored candidate images).

Figure 7:
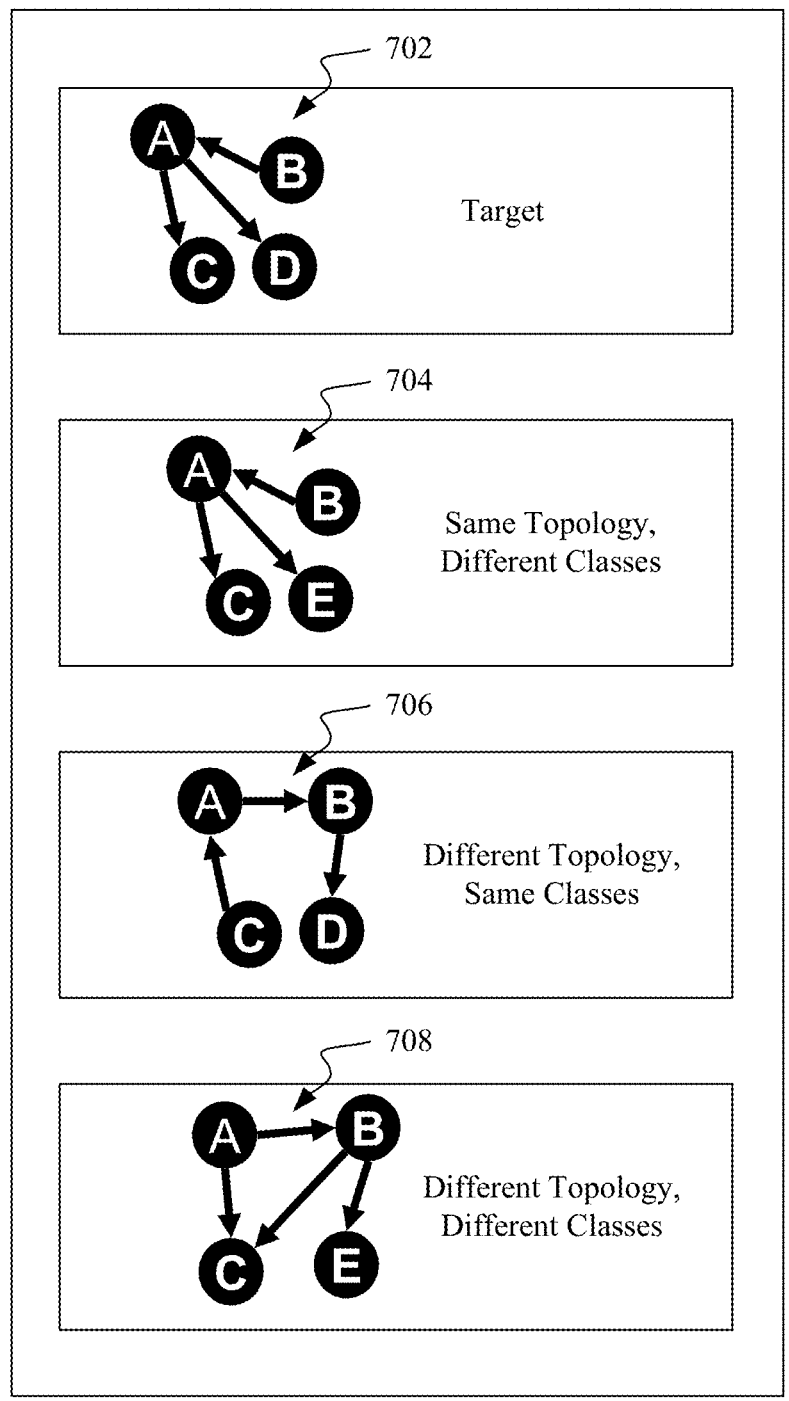
FIG. 7 depicts exemplary TKRs with various mismatches between topology and/or node classes with respect to an exemplary target TKR, according to one or more embodiments.

Referring now to FIG. 7, exemplary topological knowledge representations (TKRs) 704, 706, 708 are depicted with various mismatches between topology and/or node classes with respect to an exemplary target TKR 702 in accordance with one or more embodiments. Exemplary TKR 704 has the same topology as exemplary target TKR 702, but exemplary TKR 704 has one or more different node classes than exemplary target TKR 702. That is, exemplary target TKR 702 has a node D that is absent from exemplary TKR 704. Exemplary TKR 706 has different topology than exemplary target TKR 702, and exemplary TKR 706 has the same node classes as exemplary target TKR 702. For example, exemplary target TKR 702 has an edge connecting node A and node D that is absent from exemplary TKR 706. Exemplary TKR 708 has different topology than exemplary target TKR 702, and exemplary TKR 708 has one or more different node classes than exemplary target TKR 702. For example, exemplary target TKR 702 has a node D that is absent from exemplary TKR 708. In addition, exemplary target TKR 702 has an edge connecting node A and node D that is absent from exemplary TKR 708.

Referring now to FIG. 8, a flow diagram of a method 800 of retrieving analogues using TKR is depicted in which a TKR input query is built based on seismic dataset input by a user in accordance with one or more embodiments. The method 800 sets forth the preferred order of the blocks. It must be understood, however, that the various blocks may occur at any time relative to one another.

Blocks 802, 804, 806, 808, 810, and 812 of the method 800 shown in FIG. 8 may together correspond to block 502 of the method 500 shown in FIG. 5. In other words, blocks 802-812 of the method 800 shown in FIG. 8 provide an illustrative example of operations that may be performed in block 502 of the method shown in FIG. 5 (i.e., in the context of building a TKR input query based on a seismic dataset input by a user).

Block 814 of the method 800 shown in FIG. 8 may correspond to block 504 of the method 500 shown in FIG. 5.

The method 800 begins with a user entering a seismic input (block 802). For example, a geoscientist or other user may enter a new seismic dataset, which may be a 2-dimensional (2D) "slice" seismic image or a 3-dimensional (3D) "volume" seismic image. Optionally, a geoscientist or other user may submit part of the image or volume as the seismic image query (or region of interest). A geoscientist or other user may optionally indicate the classification of one or more regions in the image or volume (rather than depending on the system to correctly classify the one or more regions). In other words, the seismic input may be segmented automatically (e.g., using computer vision algorithms), as described below, or manually defined by the user, in case the user has the knowledge to interpret the regions to be segmented. In accordance with some embodiments, a geoscientist or other user may enter the seismic input into a client system using one or more seismic input modules (e.g., seismic input module(s) 1134 of client system 1102 in FIG. 11). The seismic input entered by the geoscientist or other user may then be sent to a server system (e.g., server system 1104 in FIG. 11).

The method 800 continues with the system segmenting the seismic input into regions and classifying the regions based on a domain-specific KB (block 804). The segmentation methods used in block 804 may consider, but are not limed to, one or more unsupervised approaches (e.g., a K-means clustering algorithm, an expectation-maximization clustering algorithm, and the like), one or more supervised approaches (e.g., a conditional random fields algorithm, and the like), and/or one or more semi-automatic approaches (e.g., a GrabCut segmentation algorithm, a Watershed segmentation algorithm, a Mean-shift segmentation algorithm, and the like). The classification methods used in block 804 may involve, but are not limited to, support vector machine (SVM), K-nearest neighbor (K-NN), convolutional neural networks (CNN), and the like. In accordance with some embodiments, different segmentation and/or classification methods may be used to provide different results from which the user may select. In accordance with some embodiments, a server system (e.g., server system 1104 in FIG. 11) may receive the seismic input from a client system (i.e., client system 1102 in FIG. 11) and then the server system may perform the segmentation and classification using algorithms contained in a CV database (e.g., CV database 1120 in FIG. 11), rules contained in a domain-specific KB (e.g., domain-specific KB 1122 in FIG. 11), and/or one or more TKR building modules (e.g., TKR building module(s) 1154 of server system 1104 in FIG. 11).

In accordance with some embodiments, the segmentation and classification performed in block 804 takes into account rules from a domain-specific KB. In a first example of such a rule, if regions A and B often occur together in a particular spatial arrangement (e.g., a cap rock is often found atop a salt dome), and A is detected with good accuracy (or informed by the user), the probability of a neighbor region to be classified as B increases. In a second example of such a rule, if regions A and B never occur together in a particular spatial arrangement, and A is detected with good accuracy (or informed by the user), the probability of a neighbor region to be classified as B decreases.

The method 800 continues with the system presenting a set of probable results of the segmentation/classification to a user and request the user to select the most relevant results (block 806). For example, the system may present a set of probable results (e.g., based on different segmentation and/or classification methods) to a geoscientist or other user and requests her/him to select the most relevant results. In accordance with some embodiments, the set of probable results may be sent from a server system (e.g., server system 1104 in FIG. 11) to a client system (e.g., client system 1102 in FIG. 11) for selection of the most relevant results. A geoscientist or other user may select the most relevant results using one or more seismic input modules (e.g., seismic input module(s) 1134 of client system 1102 in FIG. 11). The geoscientist's or other user's selection of the most relevant results, or the user's indication that the regions are not valid, may then be sent to the server system.

The method 800 continues with the system determining whether the regions are valid according to the user (block 808).

When the segmentation or classification is incorrect (block 808=No), the method 800 continues with the system requesting the user to fix one or more regions and the label associated with each such region (block 810). In accordance with some embodiments, the request may be sent by a server system (e.g., server system 1104 in FIG. 11) to a client system (e.g. client system 1102 in FIG. 11) to obtain the user's corrections. For example, a geoscientist or other user may fix the region(s) and label(s) using one or more seismic input modules (e.g., seismic input module(s) 1134 of client system 1102 in FIG. 11). The correct region(s) and label(s) may then be sent to the server system. In accordance with some embodiments, the correct region(s) and label(s) may also be sent to the CV database (e.g., CV database 1120 in FIG. 11), for re-training the considered algorithms, and to the domain-specific KB (e.g., domain-specific KB 1122 in FIG. 11), for including new rules or reinforcing current rules. Then, the method proceeds to block 812.

In response to the user selecting at least one of the results when requested to select the most relevant results of the segmentation/classification (block 808=Yes), the method 800 continues with the system building a TKR input query (block 812). When the classification is correct, such information may be sent to the domain-specific KB (e.g., domain-specific KB 1122 in FIG. 11) to increase the probability of finding such classification for the given region. In addition, in accordance with some embodiments, based on the N classified regions, the system in block 810 builds the TKR input query as a structural graph, such that each region is represented by a vertex $V_i$ in the graph (i=1, ..., N) and an edge between $V_i$ and $V_j$ is added according to the relationships between i and j (e.g., whenever regions i and j are neighbors in the input image). In accordance with some embodiments, additional information may be coded in the structural graph (e.g., each vertex may contain the percentage occupied by the region in the input image, and/or the lithology of the region). One skilled in the art will appreciate, however, that other implementations (e.g., triple stories, relational database, etc.) are possible. In accordance with some embodiments, a server system (e.g., server system 1104 in FIG. 11) may build the TKR input query using one or more TKR building modules (e.g., TKR building module(s) 1154 of server system 1104 in FIG. 11). Then, the method 800 proceeds to block 814.

In block 814, the method 800 continues with the system searching a search database (e.g., search database 1124 in FIG. 11) to retrieve at least one analogue of the TKR input query. Then, the method 800 ends. As mentioned above, block 814 may correspond to block 504 of the method 500 shown in FIG. 5. An illustrative example of operations that may be performed in block 814 (and block 504) is illustrated in FIG. 10.

Referring now to FIG. 9, a flow diagram of a method 900 of retrieving analogues using TKR is depicted in which a TKR input query is validated after being input and/or edited by a user in accordance with one or more embodiments. The method 900 sets forth the preferred order of the blocks. It must be understood, however, that the various blocks may occur at any time relative to one another.

Blocks 902, 904, 906, 908, 910, 912, and 914 of the method 900 shown in FIG. 9 may together correspond to block 502 of the method 500 shown in FIG. 5. In other words, blocks 902-914 of the method 900 shown in FIG. 9 provide an illustrative example of operations that may be performed in block 502 of the method shown in FIG. 5 (i.e., in the context of validating a TKR input query after the query was input and/or edited by a user).

Block 916 of the method 900 shown in FIG. 9 may correspond to block 504 of the method 500 shown in FIG. 5.

The method 900 begins with a user inputting or editing a TKR (block 902). For example, a geoscientist or other user may input a TKR herself/himself (e.g., using a sketch or a sample image). In accordance with some embodiments, a geoscientist or other user may input or edit the TKR into a client system using one or more TKR input/edit modules (e.g., TKR input/edit module(s) 1136 of client system 1102 in FIG. 11). The TKR that was input and/or edited by the geoscientist or other user may then be sent to a server system (e.g., server system 1104 in FIG. 11).

The method 900 continues with the system validating the TKR based on a domain-specific KB (block 904). For example, when a geoscientist or other user inputs a structural graph, the system may use the domain-specific KB to infer whether the relationships from the input graph are valid according to the rules previously stored. In accordance with some embodiments, the validation may be performed locally on a client system using one or more TKR input/edit modules (e.g., TKR input/edit module(s) 1136 of client system 1102 in FIG. 11) in conjunction with rules contained in the domain-specific KB (e.g., domain-specific KB 1122 in FIG. 11). In accordance with some embodiments, the validation may be performed, at least partially, remotely. For example, a server system (e.g., server system 1104 in FIG. 11) may receive a TKR (that was input and/or edited by the geoscientist or other user) from a client system (i.e., client system 1102 in FIG. 11) and then the server system may perform the validation using one or more TKR building modules (e.g., TKR building module(s) 1154 of server system 1104 in FIG. 11) in conjunction with rules contained in the domain specific KB (e.g., domain-specific KB 1122 in FIG. 11).

The method 900 continues with the system determining whether the TKR (input and/or edited by the user) is valid according to the domain-specific KB (block 906).

In response to determining the TKR (input and/or edited by the user) is valid according to the domain-specific KB (block 906=Yes), the method 900 proceeds to block 916.

Otherwise, in response to determining the TKR (input and/or edited by the user) is invalid according to the domain-specific KB (block 906=No), the method 900 provides feedback to the user and requests her/him to validate the TKR (block 908).

In accordance with some embodiments, the method 900 may determine "on-the-fly" (i.e., as the TKR is input and/or edited by the user) whether the TKR is valid according to the domain-specific KB. The method 900 may then provide instantaneous feedback to the user as soon as the TKR is determined to be invalid. For example, FIG. 13K denotes a screen shot of a user interface providing such an instantaneous feedback to the user (i.e., in response to the user's attempt to define a vertex in a manner contrary to a rule of the domain-specific KB—"Water can not be near salt.")

The method 900 continues with the system determining whether the user wishes to enter a new rule (block 910).

In response to determining the user wishes to enter a new rule (block 910=Yes), the method 900 continues with the system sending the new rule to the domain-specific KB and sending the TKR to the search database as a new valid structure. In accordance with some embodiments, the method 900 may consider the user's validation of the TKR (input and/or edited by the user) as the user's wish to enter a new rule (e.g., one or more new rules and/or modification of one or more rules previously stored that would be accommodative of the TKR as a valid structure).

Otherwise, in response to determining the user does not wish to enter a new rule (block 910=No), the method 900 continues by determining whether a valid subgraph search may be performed (block 914). For example, the system identifies one or more valid subgraphs by using the domain-specific KB to infer whether the relationships between regions within one or more portions of the input graph (i.e., one or more "subgraphs") are valid according to the rules previously stored. In accordance with some embodiments, the identification of valid subgraphs may be performed locally on a client system using one or more TKR input/edit modules (e.g., TKR input/edit module(s) 1136 of client system 1102 in FIG. 11) in conjunction with rules contained in the domain specific KB (e.g., domain-specific KB 1122 in FIG. 11). In accordance with some embodiments, the identification of valid subgraphs may be performed, at least partially, remotely. For example, the server system may perform the identification of valid subgraphs using one or more TKR building modules (e.g., TKR building module(s) 1154 of server system 1104 in FIG. 11) in conjunction with rules contained in the domain-specific KB (e.g., domain-specific KB 1122 in FIG. 11).

In response to determining a valid subgraph search may be performed (block 914=Yes), the method 900 proceeds to block 916. For example, instead of searching the search database for analogues of the entire TKR (input and/or edited by the user), the system searches the search database for analogues of the one or more subgraphs.

Otherwise, in response to determining a valid subgraph search may not be performed (block 914=No), the method 900 continues by returning to block 902 with the system asking the user for a new input.

In block 916, the method 900 continues with the system searching a search database (e.g., search database 1124 in FIG. 11) to retrieve at least one analogue of the TKR input query. Then, the method 900 ends. As mentioned above, block 916 may correspond to block 504 of the method 500 shown in FIG. 5. An illustrative example of operations that may be performed in block 916 (and block 504) is illustrated in FIG. 10.

Referring now to FIG. 10, a flow diagram of a method 1000 of retrieving analogues using TKR is depicted in which a system matches a TKR input query with topological data from a search database, according to one or more embodiments. The method 1000 sets forth the preferred order of the blocks. It must be understood, however, that the various blocks may occur at any time relative to one another.

Block 1002 of the method 1000 shown in FIG. 10 may correspond to block 502 of the method 500 shown in FIG. 5. Illustrative examples of operations that may be performed in block 1002 are provided by blocks 802-812 of the method 800 shown in FIG. 8 (in the context of building a TKR input query based on a seismic dataset input by a user) and blocks 902-912 of the method 900 shown in FIG. 9 (in the context of validating a TKR input query after the query was input and/or edited by a user).

Blocks 1004, 1006, 1008, 1010, and 1012 of the method 1000 shown in FIG. 10 may together correspond to block 504 in the method 500 shown in FIG. 5. In other words, blocks 1002-1012 of the method 1000 shown in FIG. 10 provide an illustrative example of operations that may be performed in block 504 of the method shown in FIG. 5.

The method 1000 begins by building and/or validating a TKR input query using a domain-specific KB (block 1002). As noted above, block 1002 may correspond to block 502 of the method 500 shown in FIG. 5. In accordance with some embodiments, a system may build the TKR input query based on a seismic dataset input by a user. For example, a system may receive a seismic dataset input by a user, segment the seismic dataset and classify each region using a CV database and the domain-specific KB, and build the TKR input query based on the segmented and classified seismic dataset. An illustrative example of operations that may be performed in block 1002 (in the context of building a TKR input query based on a seismic dataset input by a user) is illustrated in FIG. 8. In accordance with some embodiments, the TKR input query may be input and/or edited by a user. For example, the TKR input query may be input and/or edited by a user and validated using the domain-specific KB. An illustrative example of operations that may be performed in block 1002 (in the context of validating a TKR input query after the query was input and/or edited by a user) is illustrated in FIG. 9.

The method 1000 continues with the system matching the TKR input query with topological data from a search database (block 1004). In accordance with some embodiments, the search database (e.g., search database 1124 in FIG. 11) may contain entries each composed of a seismic image and a corresponding pre-computed TKR (structural graph). One or more such entries stored in the search database may be returned to a geoscientist or other user as search results of the TKR input query. The structural graph of each seismic image stored in the search database may have been previously generated using a CV database (e.g., CV database 1120 in FIG. 11) and a domain-specific KB (e.g., domain-specific KB 1122 in FIG. 1122). For example, entries in the search database may include seismic images and corresponding structural graphs added via previous operation of block 1012, described below. In accordance with some embodiments, at least some search database entries (and the TKR input query) may also contain additional information, such as metadata (e.g., seismic properties), in addition to seismic images and corresponding structural graphs. For example, FIGS. 12A-12C depict a series of screen shots of a user interface by which a user may add one or more attributes to a seismic image input query (from which the system may build the TKR input query shown in FIG. 4), according to one or more embodiments.

In accordance with some embodiments, the search database (e.g., search database 1124 in FIG. 11) may contain at least some entries each composed of a user-input/edited TKR (i.e., each such entry includes a structural graph but not a seismic image). One or more such entries stored in the search database may be returned to a geoscientist or other user as search results of the TKR input query. The user-input/edited TKRs stored in the search database may have been previously verified using a domain-specific KB (e.g., domain-specific KB 1122 in FIG. 1122). For example, entries in the search database may include user-input/edited TKRs added via previous operation of block 912 of the method 900 shown in FIG. 9 and/or block 1010, described below. In accordance with some embodiments, at least some search database entries (and the TKR input query) may also contain additional information, such as metadata (e.g., seismic properties), in addition to user-input/edited TKRs.

In accordance with some embodiments, using a valid TKR input query (built by the system or entered/edited by a geoscientist or other user), the system matches the valid TKR input query against each candidate graph from the search database via topological matching. In accordance with some embodiments, subgraphs from the search database may be considered; so the system is able to retrieve images that contain sub-regions with the desired topological structure. In other words, the valid TKR input query may be matched against individual portions of each candidate graph from the search database.

Figure 11:
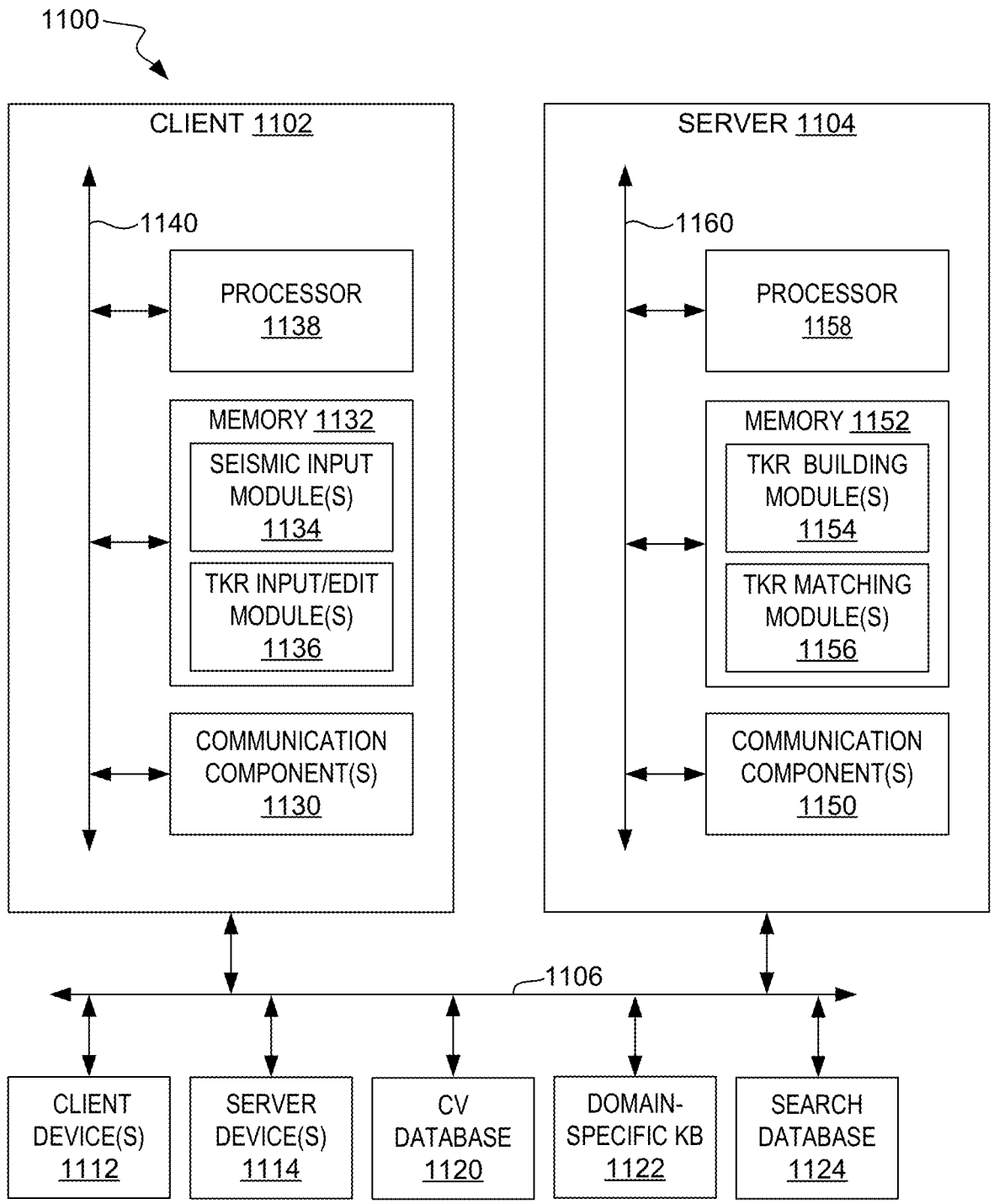
FIG. 11 illustrates a block diagram of an example, non-limiting system that facilitates retrieving analogues using TKR, according to one or more embodiments.
Figure 12A:
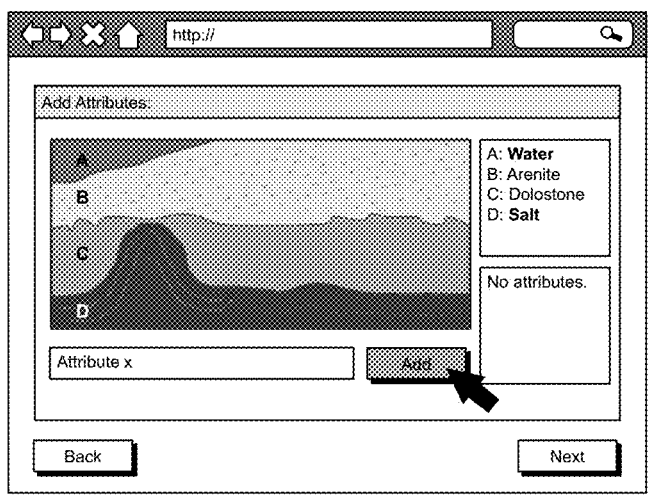
FIGS. 12A-12C depict a series of screen shots of a user interface by which a user may add one or more attributes to a seismic image input query (corresponding to the exemplary seismic image shown in FIG. 4), according to one or more embodiments.
Figure 12B:
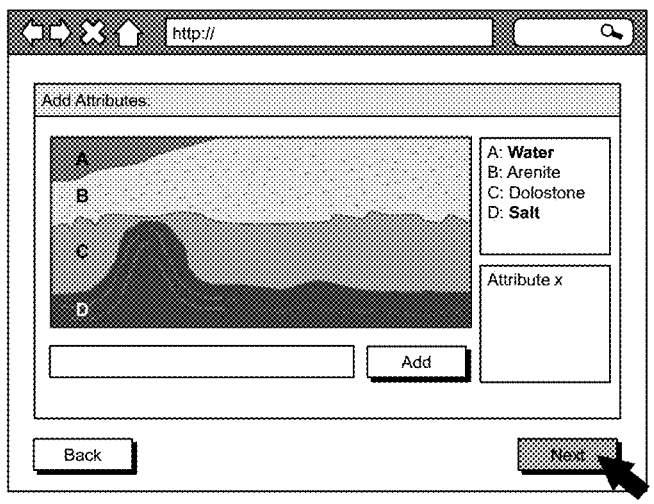
Figure 12C:
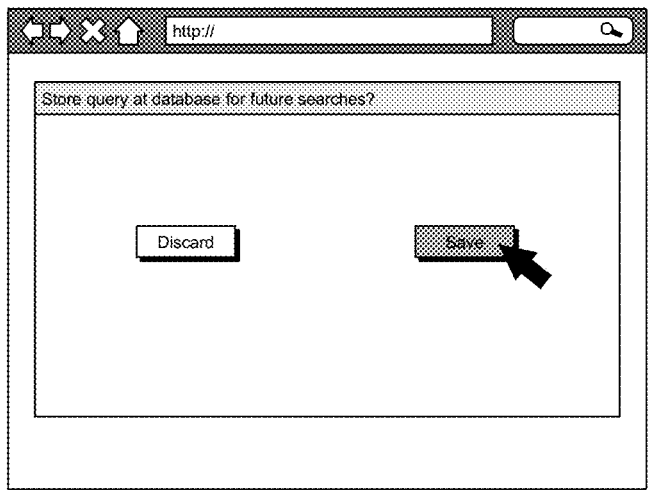

In accordance with some embodiments, a server system (e.g., server system 1104 in FIG. 11) may perform the search using one or more TKR matching modules (e.g., TKR matching module(s) 1156 of server system 1104 in FIG. 11) in conjunction with topological data from one or more search databases (e.g., search database 1124 in FIG. 11).

The method 1000 continues with the system presenting search results to a user (block 1006). For example, the system may present the search results to a geoscientist or other user so that she/he can use the search results to inform her/his decision making process. In accordance with some embodiments, the search results may be sent from a server system (e.g., server system 1104 in FIG. 11) to a client system (e.g., client system 1102 in FIG. 11) for presentation to a geoscientist or other user.

In accordance with some embodiments, the user may add his/her TKR input query to the search database, to be used to as a candidate graph in future queries. To facilitate adding the TKR input query to the search database, in accordance with some embodiments, the system may determine whether the user entered a seismic image (e.g., in block 802 of the method 800 shown in FIG. 8) or input/edited a TKR (e.g., in block 902 of the method 900 shown in FIG. 9). For example, the method 1000 may continue with the system determining whether the user entered a seismic image (block 1008).

In response to determining the user did not enter a seismic image but rather the user input/edited a TKR (e.g., in block 902 of the method 900 shown in FIG. 9) (block 1008=No), the method 1000 continues with the system storing the input TKR in the search database (block 1010). Then, the method 1000 ends.

Otherwise, in response to determining the user entered a seismic image (e.g., in block 802 of the method 800 shown in FIG. 8) (block 1008=Yes), the method 1000 continues with the system storing the input seismic image in the search database, along with input seismic image's corresponding TKR (block 1012). Then, the method 1000 ends.

Referring now to FIG. 11, a block diagram of an example, non-limiting system 1100 that facilitates retrieving analogues using TKR is illustrated in accordance with one or more embodiments. Repetitive description of like elements employed in other embodiments described herein is omitted for the sake of brevity. Aspects of systems (e.g., system 1100 and the like), apparatuses, or processes explained in this disclosure may constitute machine-executable program module(s) embodied within machine(s), e.g., embodied in one or more computer readable mediums (or media) associated with one or more machines. Such program module(s), when executed by the one or more machines, e.g., one or more computers, one or more computing devices, one or more virtual machines, etc., may cause the one or more machines to perform the operations described.

As shown in FIG. 11, the system 1100 may include one or more client systems 1102, 1112, one or more server systems 1104, 1114, one or more networks 1106, one or more CV databases 1120, one or more knowledge bases 1122, and one or more search databases 1124. It is to be appreciated that the one or more client systems 1102, 1112, the one or more server systems 1104, 1114, the one or more CV databases 1120, the one or more knowledge bases 1122, and the one or more search databases 1124 may be equipped with communication devices (e.g., one or more communication components 1130, described below, with respect to client system 1102) that enable communication between the one or more client systems 1102, 1112, the one or more server systems 1104, 1114, the one or more CV databases 1120, the one or more knowledge bases 1122, and the one or more search databases 1124 over the one or more networks 1106.

Client systems 1102, 1112 may include the functionality described herein with respect to user input (e.g., seismic dataset input, TKR input/editing, etc.). Client system 1112 may be a different type of client system than client system 1102. Client system 1112 may also be a client system 1102 and/or include one or more components of client system 1102. It is to be appreciated that in discussions below where more than one client system is employed, the client systems may include one or more client systems 1102 and/or one or more client systems 1112.

Server systems 1104, 1114 may include the functionality described herein with respect to system-built TKRs and analogue retrieval (e.g., building a TKR input query from a user-input seismic dataset, matching TKRs, etc.). Server system 1114 may be a different type of client system than server system 1104. Server system 1114 may also be a server system 1104 and/or include one or more components of client system 1104. It is to be appreciated that in discussions below where more than one server system is employed, the server systems may include one or more server systems 1104 and/or one or more server systems 1114.

The various components (e.g., client systems 1102, 1112, server systems 1104, 1114, CV database 1120, domain-specific KB 1122, search database 1124, communication components 1130, 1150, memory 1132, 1152, processor 1138, 1158, and/or other components) of system 1100 may be connected directly or via one or more networks 1106. Such networks 1106 may include wired and wireless networks, including, but not limited to, a cellular network, a wide area network (WAN) (e.g., the Internet), and/or a local area network (LAN), non-limiting examples of which include cellular, WAN, wireless fidelity (Wi-Fi), Wi-Mal, WLAN, radio communication, microwave communication, satellite communication, optical communication, sonic communication, electromagnetic induction communication, and/or any other suitable communication technology.

Client system 1102 may include one or more communication components 1130 that enable client system 1102 to communicate with one or more server systems 1104, 1114, one or more other client devices 1112, one or more CV databases 1120, one or more domain-specific KBs 1122, and/or one or more search databases 1124 over one or more networks 1106 via wireless and/or wired communications. For example, the one or more communication components 1130 may correspond to network adapter 20 in FIG. 1.

Client system 1102 may include or otherwise be associated with at least one memory 1132 that may store computer executable program module(s) (e.g., computer executable program module(s) may include, but are not limited to, seismic input module(s) 1134, TKR edit/input module(s) 1136, and associated program module(s)). Seismic input module(s) 1134 and TKR edit/input module(s) 1136 may correspond to program modules 42 in FIG. 1. Client system 1102 may also include or otherwise be associated with at least one processor 1138 that executes the computer executable program module(s) stored in the memory 1132. Client system 1102 may further include a system bus 1140 that may couple the various components including, but not limited to, communication component(s) 1130, memory 1132, processor 1138, and/or other components.

While the client system 1102 is shown in FIG. 11 as including seismic input module(s) 1134 and TKR edit/input module(s) 1136, in other embodiments, any number of different types of devices may be associated with or include all or some of the seismic input module(s) 1134 and/or the TKR edit/input module(s) 1136. For example, one or more server systems 1104, 1114 may include all or some of the seismic input module(s) 1134 and/or the TKR edit/input module(s) 1136. In other words, data processing associated with user input (e.g., seismic dataset input, TKR input/editing, etc.) may be performed locally (e.g., using the processor 1138) and/or remotely (e.g., at server system 1104 using processor 1158). All such embodiments are envisaged.

Server system 1104 may include one or more communication components 1150 that enable server system 1104 to communicate with one or more client systems 1102, 1112, one or more other server devices 1114, one or more CV databases 1120, one or more domain-specific KBs 1122, and/or one or more search databases 1124 over one or more networks 1106 via wireless and/or wired communications. For example, the one or more communication components 1150 may correspond to network adapter 20 in FIG. 1.

Server system 1104 may include or otherwise be associated with at least one memory 1152 that may store computer executable program module(s) (e.g., computer executable program module(s) may include, but are not limited to, TKR building module(s) 1154, TKR matching module(s) 1156, and associated program module(s)). TKR building module(s) 1154 and TKR matching module(s) 1156 may correspond to program modules 42 in FIG. 1. Server system 1104 may also include or otherwise be associated with at least one processor 1158 that executes the computer executable program module(s) stored in the memory 1152. Server system 1104 may further include a system bus 1160 that may couple the various components including, but not limited to, communication component(s) 1150, memory 1152, processor 1158, and/or other components.

While the server system 1104 is shown in FIG. 11 as including TKR building module(s) 1154 and TKR matching module(s) 1156, in other embodiments, any number of different types of devices may be associated with or include all or some of the TKR building module(s) 1154 and/or the TKR matching module(s) 1156. For example, one or more client systems 1102, 1112 may include all or some of the TKR building module(s) 1154 and/or the TKR matching module(s) 1156. In other words, data processing associated with system-built TKRs and analogue retrieval (e.g., TKR building, TKR matching, etc.) may be performed locally (e.g., using the processor 1158) and/or remotely (e.g., at client system 1102 using processor 1138). All such embodiments are envisaged.

Referring now to FIGS. 12A-12C, a series of screen shots of a user interface is depicted by which a user may add one or more attributes to a seismic image input query (corresponding to the exemplary seismic image 402 shown in FIG. 4, from which the system may build the TKR input query 404) in accordance with one or more embodiments.

In FIG. 12A, the user enters "Attribute x" in a text box within an "Add Attributes:" frame of the user interface to add that particular attribute to the seismic image input query and selects the "Add" button.

In FIG. 12B, the user selects the "Next" button of the user interface to confirm the addition of "Attribute x".

In FIG. 12C, the user selects the "Save" button of the "Store query at database for future searches?" frame of the user interface to store the modified query.

Figure 13A:
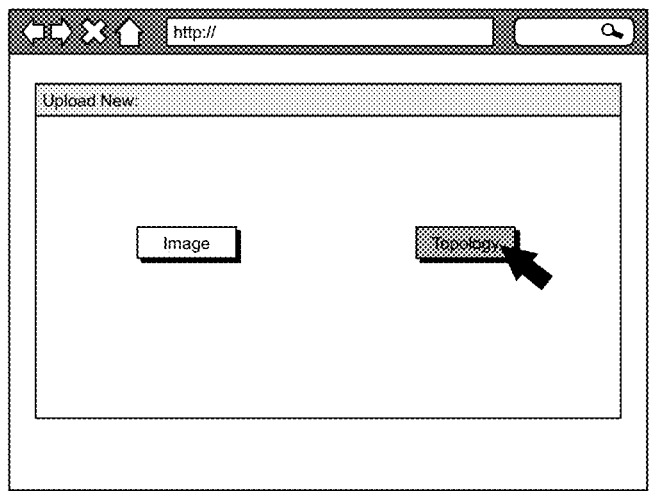
FIGS. 13A-13Q depict a series of screen shots of a user interface by which a user may input and/or edit a TKR input query, according to one or more embodiments.
Figure 13B:
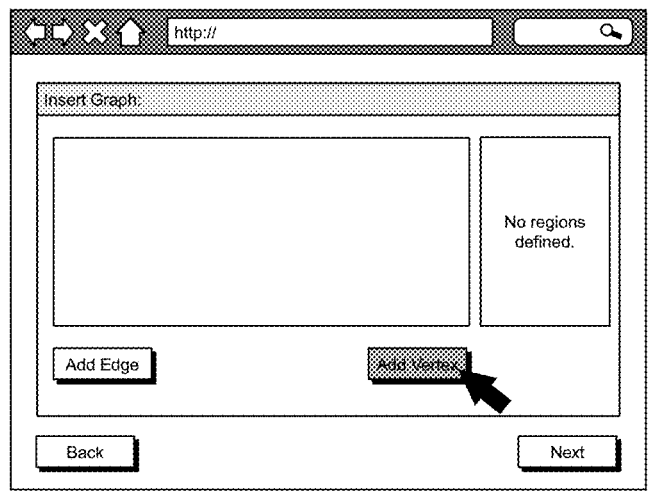
Figure 13C:
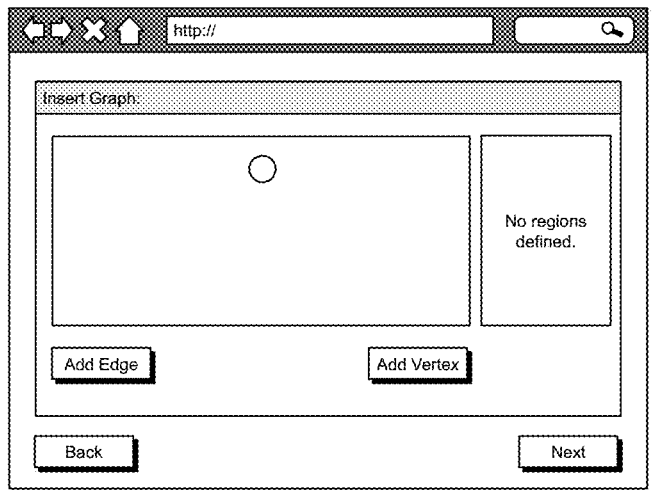
Figure 13D:
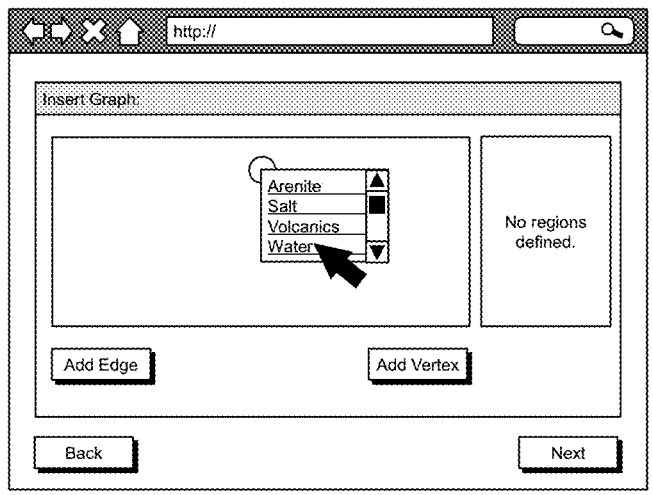
Figure 13E:
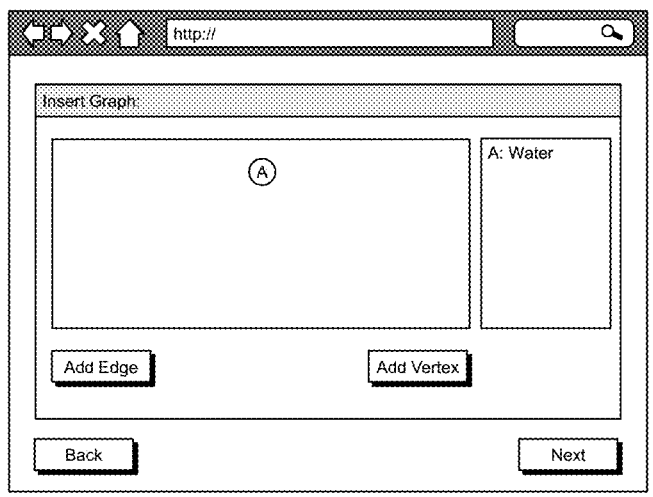
Figure 13F:
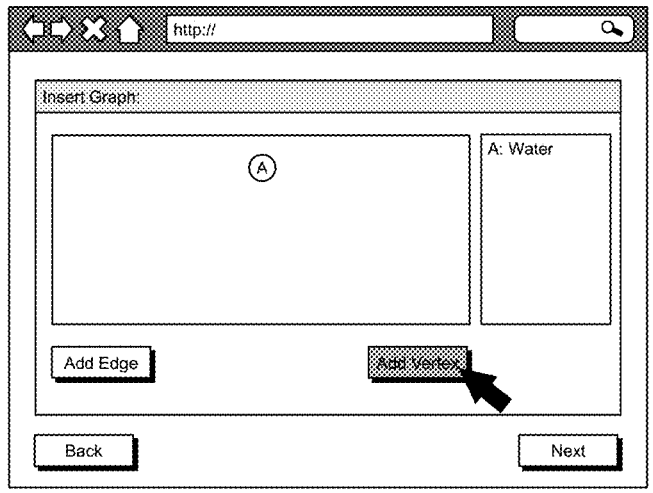
Figure 13G:
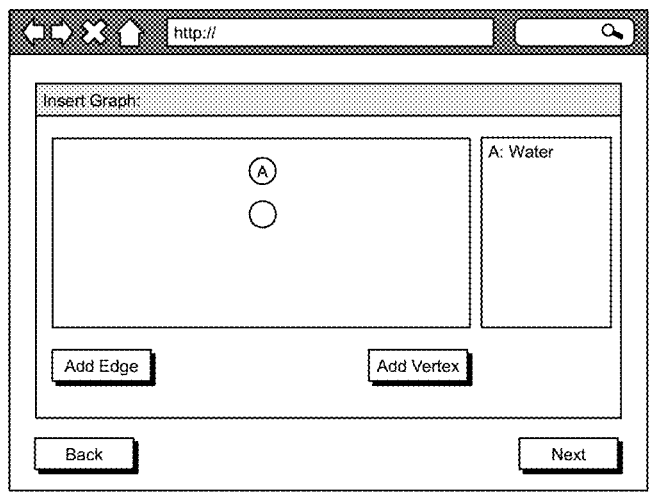
Figure 13H:
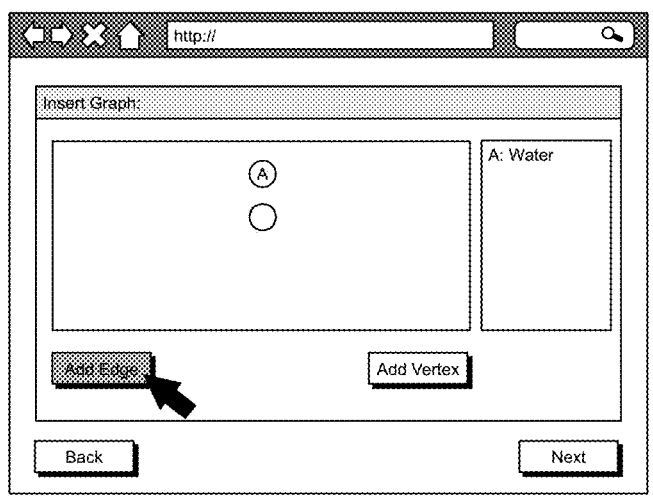
Figure 13I:
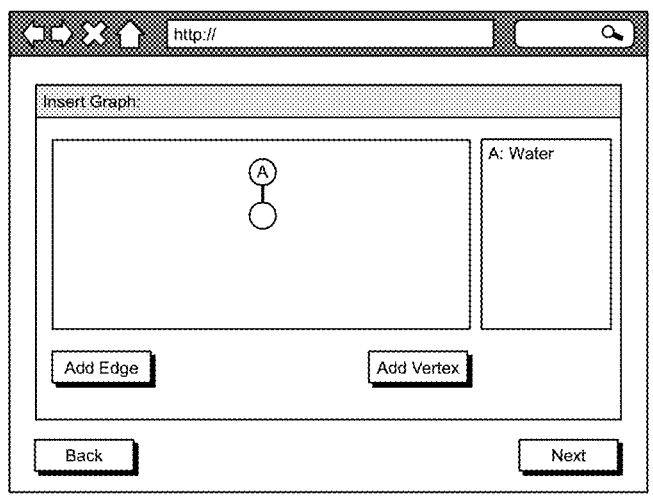
Figure 13J:
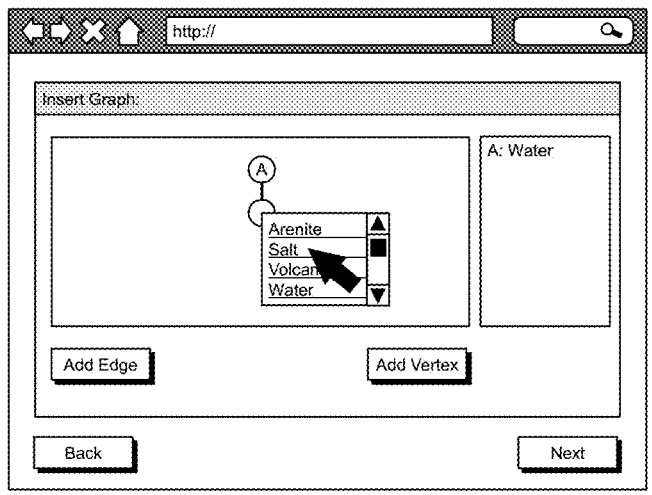
Figure 13K:
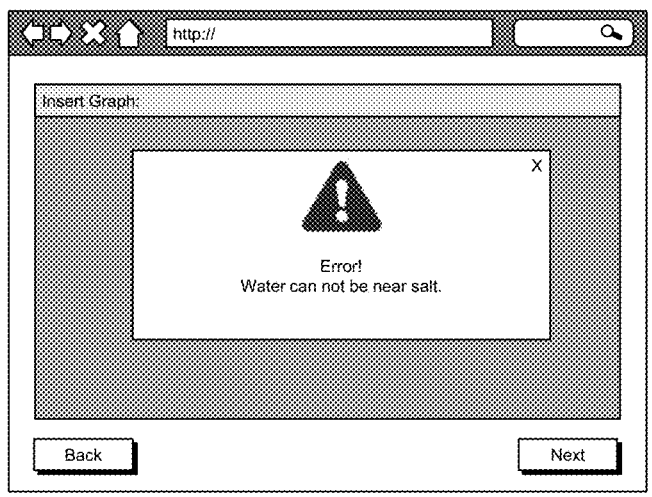
Figure 13L:
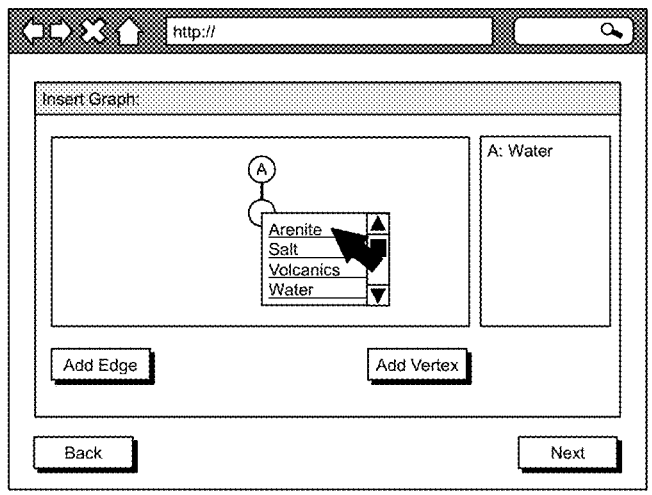
Figure 13M:
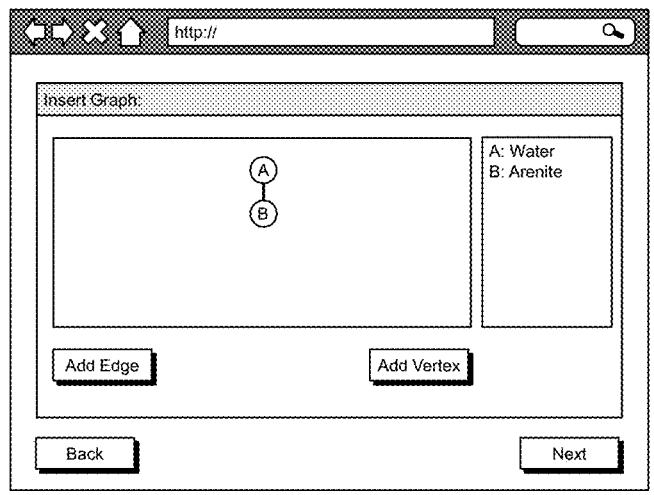
Figure 13N:
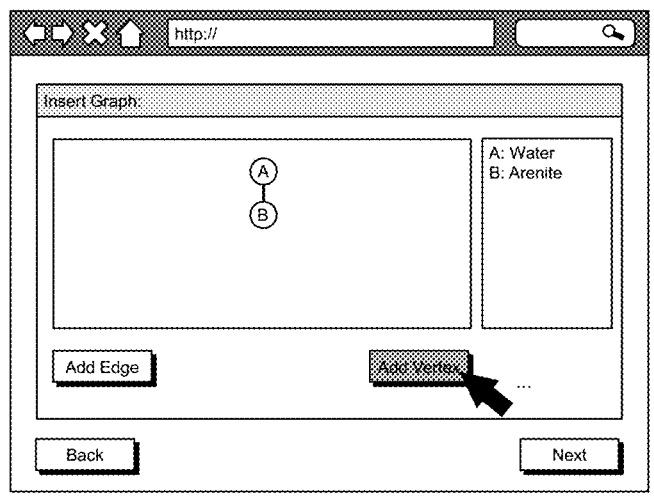
Figure 13O:
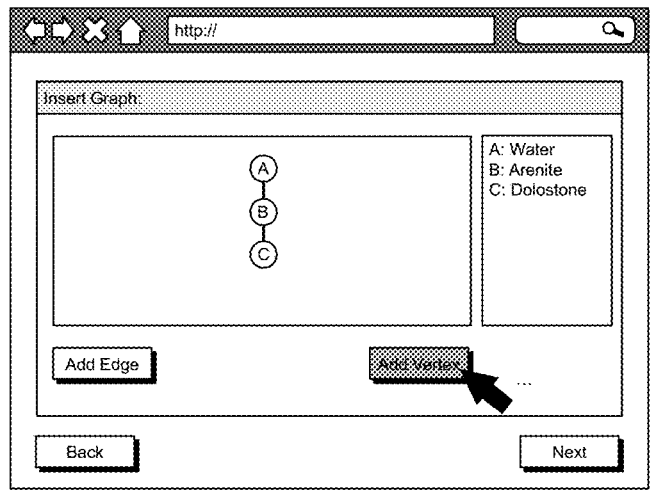
Figure 13P:
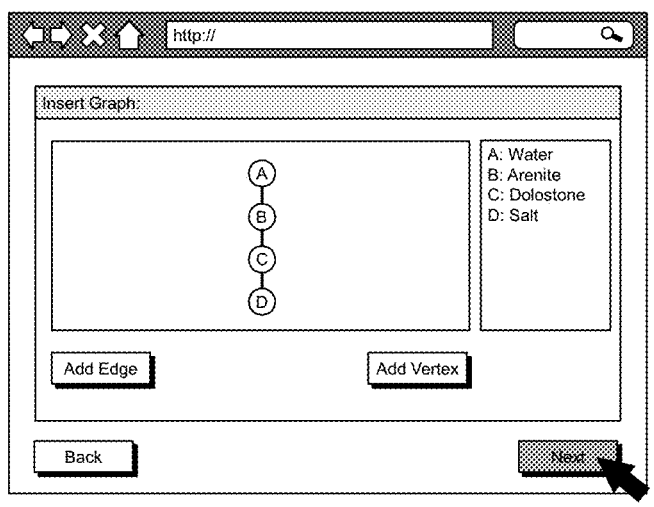
Figure 13Q:
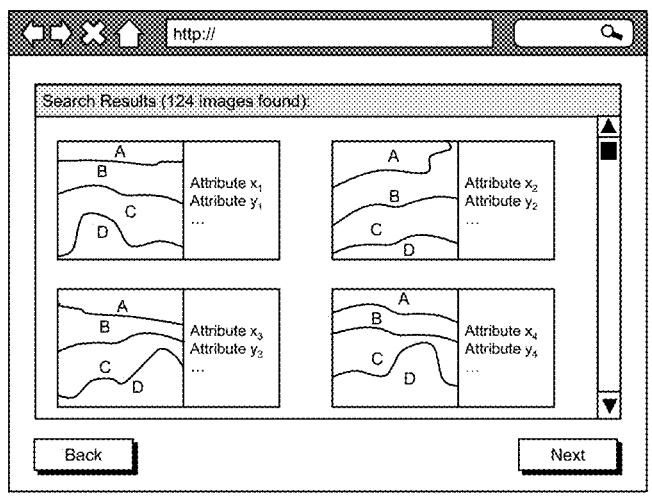

Referring now to FIGS. 13A-13Q, a series of screen shots of a user interface is depicted by which a user may input and/or edit a TKR input query in accordance with one or more embodiments.

In FIG. 13A, the user selects the "Topology" button of the "Upload New:" frame of the user interface to begin the process of uploading a new TKR input query.

In FIG. 13B, the user selects the "Add Vertex" button of the "Insert Graph:" frame of the user interface to begin the process of adding a vertex.

In FIG. 13C, the system places a first vertex symbol in a graph box within the "Insert Graph:" frame of the user interface.

In FIG. 13D, the user selects "Water" from a dropdown menu within the "Insert Graph:" frame of the user interface to define the region corresponding to the vertex.

In FIG. 13E, the system inserts a label "A" within the first vertex symbol in the graph box and places an entry "A: Water" in a key box within the "Insert Graph:" frame of the user interface to reflect the user's selection of "Water" from the dropdown menu.

In FIG. 13F, the user again selects the "Add Vertex" button of the "Insert Graph:" frame of the user interface to begin the process of adding a second vertex.

In FIG. 13G, the system has placed a second vertex symbol in the graph box within the "Insert Graph:" frame of the user interface.

In FIG. 13H, the user selects the "Add Edge" button of the "Insert Graph:" frame of the user interface to add an edge between the first vertex and the second vertex.

In FIG. 13I, the system places an edge between the first vertex and the second vertex in the graph box within the "Insert Graph:" frame of the user interface.

In FIG. 13J, the user mistakenly selects "Salt" from a dropdown menu within the "Insert Graph:" frame of the user interface to define the region corresponding to the second vertex.

In FIG. 13K, the system, using a domain-specific KB in accordance with some embodiments, identifies the user's mistake and places a warning box in the user interface that states, "Error! Water can not be near salt."

In FIG. 13L, the user correctly selects "Arenite" from a dropdown menu within the "Insert Graph:" frame of the user interface to define the region corresponding to the second vertex.

In FIG. 13M, the system inserts a label "B" within the second vertex symbol in the graph box and places an entry "B: Arenite" in the key box within the "Insert Graph:" frame of the user interface to reflect the user's corrected selection of "Arenite" from the dropdown menu.

In FIG. 13N, the user again selects the "Add Vertex" button of the "Insert Graph:" frame of the user interface to begin the process of adding a third vertex. Subsequent steps in the process of adding the third vertex and an edge between the second vertex and the third vertex are omitted to avoid repetition. The third vertex is defined as "Dolostone".

In FIG. 13O, the user again selects the "Add Vertex" button of the "Insert Graph:" frame of the user interface to begin the process of adding a fourth vertex. Subsequent steps in the process of adding the fourth vertex and an edge between the third vertex and the fourth vertex are omitted to avoid repetition. The fourth vertex is defined "Salt".

In FIG. 13P, the user selects the "Next" button in the user interface to insert the graph and initiate the search of the search database for the graph.

In FIG. 13Q, the search results found in the search of the search database are returned in the user interface.

Figure 14:
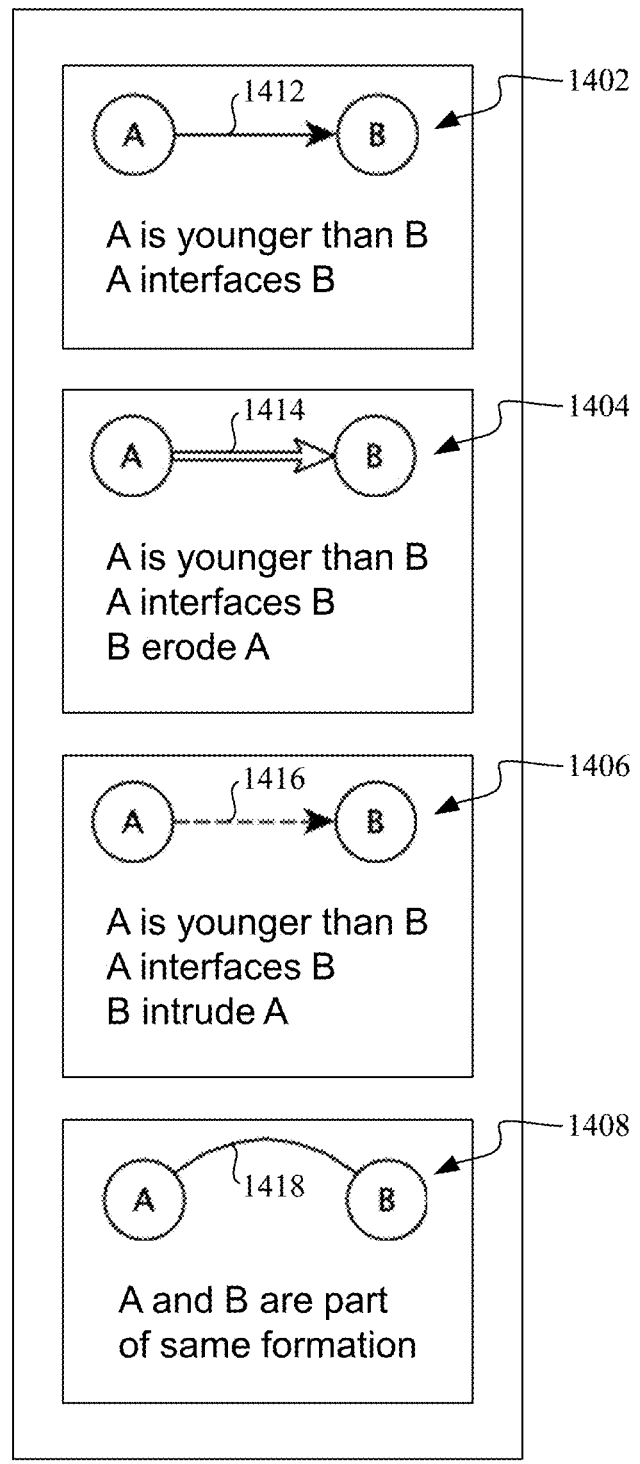
FIG. 14 depicts exemplary TKRs each having a different edge-type, according to one or more embodiments.

Referring now to FIG. 14, exemplary topological knowledge representations (TKRs) 1402, 1404, 1406, and 1408 are depicted each having a different edge-type 1412, 1414, 1416, and 1418 in accordance with one or more embodiments. In the embodiment illustrated in FIG. 14, the edge 1412 is a solid arrow that represents the relationships "is younger than" and "interfaces" between nodes (i.e., region A is younger than region B, and region A interfaces region B). In the embodiment illustrated in FIG. 14, the edge 1414 is a hollow arrow that represents the relationships "is younger than", "interfaces", and "erode" between nodes (i.e., region A is younger than region B, region A interfaces region B, and region B erodes region A). In the embodiment illustrated in FIG. 14, the edge 1416 is a dotted arrow that represents the relationships "is younger than", "interfaces", and "intrude" between nodes (i.e., region A is younger than region B, region A interfaces region B, and region B intrudes region A). In the embodiment illustrated in FIG. 14, the edge 1418 is a line that represents the relationships "are part of the same formation" and "interfaces" between nodes (i.e., region A and region B are part of the same formation, and region A interfaces region B).

The following three illustrative rules are examples of the types of rules that may be contained in a domain-specific KB for use in validating TKRs.

Rule_1: If region A intrudes ANY region, region A is "Igneous" or "Evaporite".

Rule_2: If region A intrudes region B and region A is "Igneous", region A is YOUNGER than region B.

Rule_3: If region A intrudes region B and region A is "Evaporite", region A is OLDER than region B.

Figure 15:
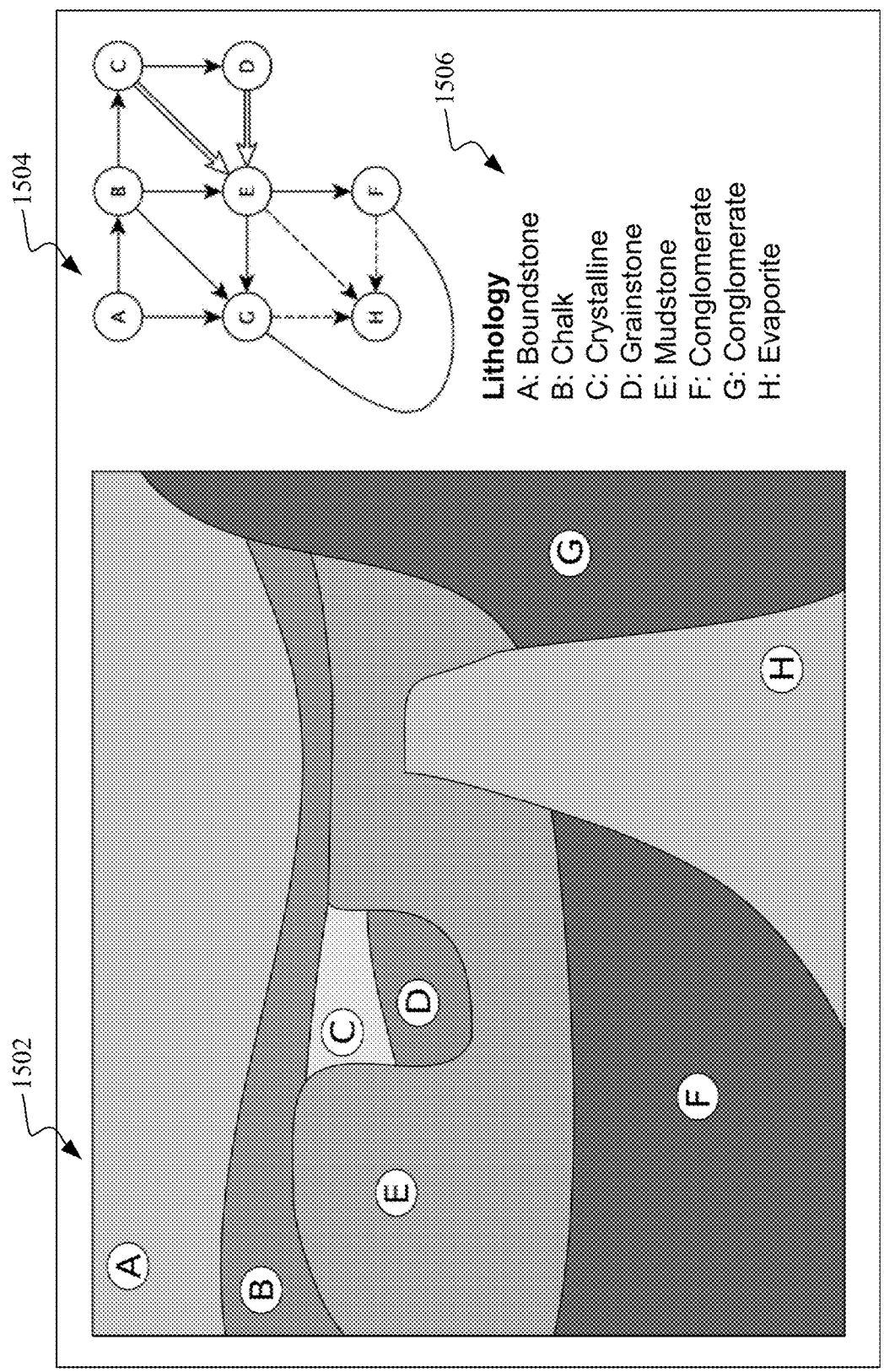
FIG. 15 depicts an exemplary seismic image and corresponding TKR with multiple edge-types, according to one or more embodiments.

Referring now to FIG. 15, an exemplary seismic image 1502 and corresponding TKR 1504 with multiple edge-types are depicted in accordance with one or more embodiments. The exemplary seismic image 1502, as illustrated in FIG. 15, represents a seismic dataset that has been segmented and classified into eight regions (denoted as A, B, C, D, E, F, G, and H). The TKR 1504 is a structural graph corresponding to the exemplary seismic image 1502. The TKR 1504 includes eight vertices (denoted as A, B, C, D, E, F, G, and H) that respectively correspond to the eight regions A, B, C, D, E, F, G, and H of the exemplary seismic image 1502. In the embodiment illustrated in FIG. 15, the vertices respectively represent each region's "Lithology", i.e., region A is "Boundstone", region B is "Chalk", region C is "Crystalline", region D is "Grainstone", region E is "Mudstone", region F is "Conglomerate", region G is "Conglomerate", and region H is "Evaporite". In the embodiment illustrated in FIG. 15, each region's "Lithology" is denoted in a table 1506. The multiple edge-types of the TKR illustrated in FIG. 15 correspond to the edge-types 1412, 1414, 1416, and 1418 illustrated in FIG. 14.

If the user mistakenly tries to label region H in FIG. 15 as "Shale", the system, by applying the three above-noted illustrative rules contained in a domain-specific KB for use in validating TKRs, may provide feedback to the user indicating that the graph is invalid due to Rule_1.

If the user mistakenly tries to label region H in FIG. 15 as "Diabase", which is a type of "Igneous", the system, by applying the three above-noted rules contained in a domain-specific KB for use in validating TKRs, may provide feedback to the user indicating that the graph is invalid due to Rule_2 because region H must be younger than regions F, G, and E.

Figure 16:
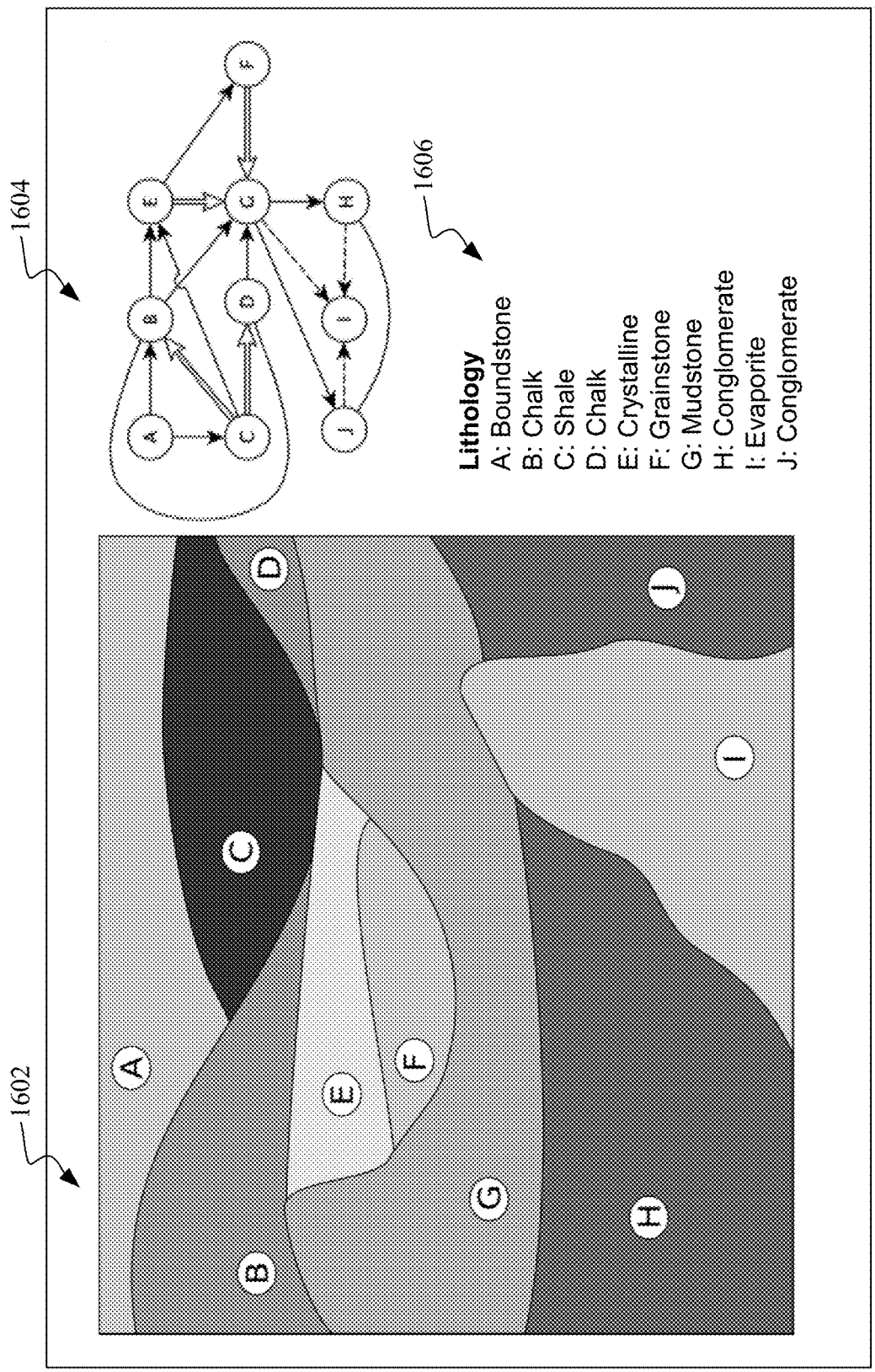
FIG. 16 depicts another exemplary seismic image and corresponding TKR with multiple edge-types, according to one or more embodiments.

Referring now to FIG. 16, another exemplary seismic image 1602 and corresponding TKR 1604 with multiple edge-types are depicted in accordance with one or more embodiments. The exemplary seismic image 1602, as illustrated in FIG. 16, represents a seismic dataset that has been segmented and classified into ten regions (denoted as A, B, C, D, E, F, G, H, I, and J). The TKR 1604 is a structural graph corresponding to the exemplary seismic image 1602. The TKR 1604 includes ten vertices (denoted as A, B, C, D, E, F, G, H, I, and J) that respectively correspond to the ten regions A, B, C, D, E, F, G, H, I, and J of the exemplary seismic image 1602. In the embodiment illustrated in FIG. 16, the vertices respectively represent each region's "Lithology", i.e., region A is "Boundstone", region B is "Chalk", region C is "Shale", region D is "Chalk", region E is "Crystalline", region F is "Grainstone", region G is "Mudstone", region H is "Conglomerate", region I is "Evaporite", and region J is "Conglomerate". In the embodiment illustrated in FIG. 16, each region's "Lithology" is denoted in a table 1606. The multiple edge-types of the TKR illustrated in FIG. 16 correspond to the edge-types 1412, 1414, 1416, and 1418 illustrated in FIG. 14.

Figure 17:
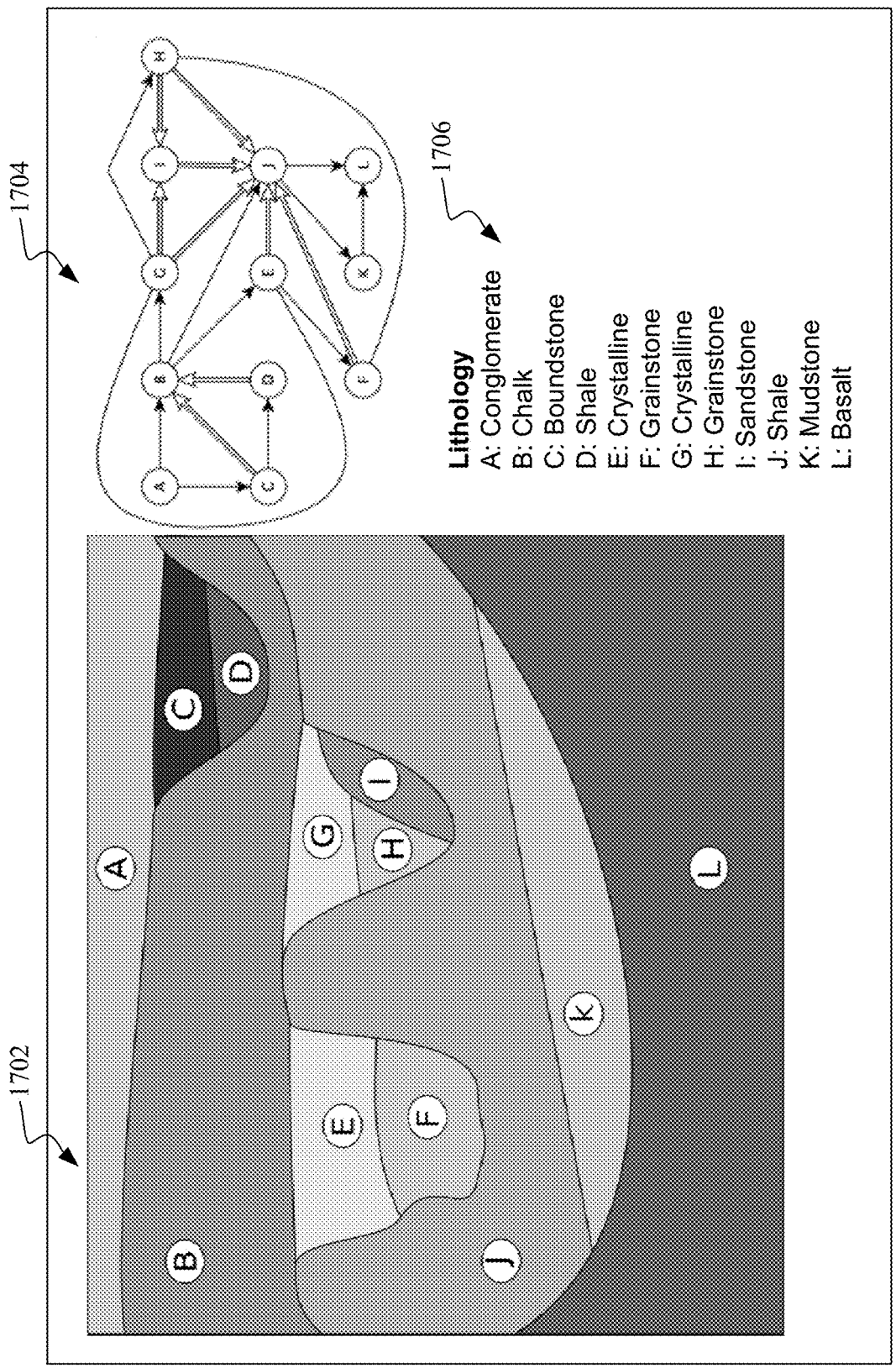
FIG. 17 depicts yet another exemplary seismic image and corresponding TKR with multiple edge-types, according to one or more embodiments.

Referring now to FIG. 17, yet another exemplary seismic image 1702 and corresponding TKR 1704 with multiple edge-types are depicted in accordance with one or more embodiments. The exemplary seismic image 1702, as illustrated in FIG. 17, represents a seismic dataset that has been segmented and classified into twelve regions (denoted as A, B, C, D, E, F, G, H, I, J, K, and L). The TKR 1704 is a structural graph corresponding to the exemplary seismic image 1702. The TKR 1704 includes twelve vertices (denoted as A, B, C, D, E, F, G, H, I, J, K, and L) that respectively correspond to the twelve regions A, B, C, D, E, F, G, H, I, J, K, and L of the exemplary seismic image 1702. In the embodiment illustrated in FIG. 17, the vertices respectively represent each region's "Lithology", i.e., region A is "Conglomerate", region B is "Chalk", region C is "Boundstone", region D is "Shale", region E is "Crystalline", region F is "Grainstone", region G is "Crystalline", region H is "Grainstone", region I is "Sandstone", region J is "Shale", region K is "Mudstone", and region L is "Basalt". In the embodiment illustrated in FIG. 17, each region's "Lithology" is denoted in a table 1706. The multiple edge-types of the TKR illustrated in FIG. 17 correspond to the edge-types 1412, 1414, 1416, and 1418 illustrated in FIG. 14.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. For example, the particular hardware and software implementation details described herein are merely for illustrative purposes and are not meant to limit the scope of the described subject matter. Thus, while the present invention has been particularly shown and described with reference to preferred embodiments thereof, it will be understood by those skilled in the art that changes in form and details may be made therein without departing from the spirit and scope of the present invention.

What is claimed is:

1. A method of retrieving analogues using topological knowledge representation (TKR), the method comprising:
    using a domain-specific knowledge base (KB) to build and/or validate a TKR input query;
    searching a search database to retrieve at least one analogue of the TKR input query using statistical analysis.

2. The method as recited in claim 1, wherein using a domain-specific knowledge base (KB) to build and/or validate a TKR input query includes:
    receiving a seismic dataset;
    segmenting the seismic dataset into regions and classifying each of the regions using the domain-specific KB to produce a segmented and classified seismic dataset;
    building the TKR input query based on the segmented and classified seismic dataset.

3. The method as recited in claim 2, wherein receiving a seismic dataset includes receiving a 2-dimensional (2D) slice seismic image.

4. The method as recited in claim 2, wherein receiving a seismic dataset includes receiving a 3-dimensional (3D) volume seismic image.

5. The method as recited in claim 2, wherein segmenting the seismic dataset into regions and classifying each of the regions using the domain-specific KB to produce a segmented and classified seismic dataset includes segmenting the seismic dataset by employing an unsupervised approach selected from the group consisting of a K-means clustering algorithm and an expectation-maximization clustering algorithm.

6. The method as recited in claim 2, wherein segmenting the seismic dataset into regions and classifying each of the regions using the domain-specific KB to produce a segmented and classified seismic dataset includes segmenting the seismic dataset by employing a supervised approach including a conditional random fields algorithm.

7. The method as recited in claim 2, wherein segmenting the seismic dataset into regions and classifying each of the regions using the domain-specific KB to produce a segmented and classified seismic dataset includes segmenting the seismic dataset by employing a semi-automatic approach selected from the group consisting of a GrabCut segmentation algorithm, a Watershed segmentation algorithm, and a Mean-shift segmentation algorithm.

8. The method as recited in claim 2, wherein segmenting the seismic dataset into regions and classifying each of the regions using the domain-specific KB to produce a segmented and classified seismic dataset includes classifying each of the regions by employing a classification approach selected from the group consisting of support vector machine (SVM), K-nearest neighbor (K-NN), and convolutional neural networks (CNN).

9. The method as recited in claim 1, wherein using a domain-specific knowledge base (KB) to build and/or validate a TKR input query includes:
    receiving the TKR input query for validation, wherein the TKR input query was input and/or edited by a user;
    validating the TKR input query using the domain-specific KB.

10. The method as recited in claim 1, wherein searching a search database to retrieve at least one analogue of the TKR input query using statistical analysis includes finding an analogous geological region by searching for at least one analogous seismic dataset existing in the search database by comparing the TKR input query with a plurality of pre-computed TKRs existing in the search database each respectively corresponding to one of a plurality of seismic datasets existing in the search database.

11. The method as recited in claim 1, wherein searching a search database to retrieve at least one analogue of the TKR input query using statistical analysis includes:
   finding a plurality of analogous geological regions by searching for analogous seismic datasets existing in the search database by comparing the TKR input query with a plurality of pre-computed TKRs existing in the search database each respectively corresponding to one of a plurality of seismic datasets existing in the search database;
   ranking the plurality of analogous geological regions.

12. The method as recited in claim 11, wherein finding a plurality of analogous geological regions by searching for analogous seismic datasets existing in the search database by comparing the TKR input query with a plurality of pre-computed TKRs existing in the search database each respectively corresponding to one of a plurality of seismic datasets existing in the search database includes measuring the similarity between the TKR input query and each respective one of the pre-computed TKRs by calculating each pair's similarity score.

13. The method as recited in claim 12, wherein ranking the plurality of analogous geological regions includes ordering each pair's similarity score.

14. A system for retrieving analogues using topological knowledge representation (TKR), the system comprising:
   one or more processors, one or more computer readable storage devices, and program instructions stored on at least one of the one or more computer readable storage devices for execution by at least one of the one or more processors, the program instructions executable to:
      use a domain-specific knowledge base (KB) to build and/or validate a TKR input query;
      search a search database to retrieve at least one analogue of the TKR input query using statistical analysis.

15. The system as recited in claim 14, wherein the program instructions executable to use a domain-specific knowledge base (KB) to build and/or validate a TKR input query include program instructions executable to:
   receive a seismic dataset;
   segment the seismic dataset into regions and classify each of the regions using the domain-specific KB to produce a segmented and classified seismic dataset;
   build the TKR input query based on the segmented and classified seismic dataset.

16. The system as recited in claim 14, wherein the program instructions executable to use a domain-specific knowledge base (KB) to build and/or validate a TKR input query include program instructions executable to:
   receive the TKR input query for validation, wherein the TKR input query was input and/or edited by a user;
   validate the TKR input query using the domain-specific KB.

17. The system as recited in claim 14, wherein the program instructions executable to search a search database to retrieve at least one analogue of the TKR input query using statistical analysis include program instructions executable to find an analogous geological region by searching for at least one analogous seismic dataset existing in the search database by comparing the TKR input query with a plurality of pre-computed TKRs existing in the search database each respectively corresponding to one of a plurality of seismic datasets existing in the search database.

18. A computer program product for retrieving analogues using topological knowledge representation (TKR), the computer program product comprising a computer readable storage medium having program code embodied therewith, the program code executable by one or more processors, to perform a method comprising:
   using a domain-specific knowledge base (KB) to build and/or validate a TKR input query;
   searching a search database to retrieve at least one analogue of the TKR input query using statistical analysis.

19. The computer program product as recited in claim 18, wherein using a domain-specific knowledge base (KB) to build and/or validate a TKR input query includes:
   receiving a seismic dataset;
   segmenting the seismic dataset into regions and classifying each of the regions using the domain-specific KB to produce a segmented and classified seismic dataset;
   building the TKR input query based on the segmented and classified seismic dataset.

20. The computer program product as recited in claim 18, wherein using a domain-specific knowledge base (KB) to build and/or validate a TKR input query includes:
   receiving the TKR input query for validation, wherein the TKR input query was input and/or edited by a user;
   validating the TKR input query using the domain-specific KB.

21. A method of retrieving analogues using topological knowledge representation (TKR), the method comprising:
   using a domain-specific knowledge base (KB) to build and/or validate a TKR input query;
   matching the TKR input query with topological data from a search database to retrieve at least one analogue of the TKR input query.

* * * * *